US009949220B2

United States Patent
Abedini et al.

(10) Patent No.: US 9,949,220 B2
(45) Date of Patent: Apr. 17, 2018

(54) UPLINK SCHEDULING WITH POWER CONTROL COMMAND IN AN FDD HALF-DUPLEX NETWORK

(71) Applicant: QUALCOMM Incorporated, San Diego, CA (US)

(72) Inventors: Navid Abedini, Raritan, NJ (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 15/046,684

(22) Filed: Feb. 18, 2016

(65) Prior Publication Data

US 2016/0286559 A1 Sep. 29, 2016

Related U.S. Application Data

(60) Provisional application No. 62/139,414, filed on Mar. 27, 2015.

(51) Int. Cl.
*H04W 72/04* (2009.01)
*H04W 52/58* (2009.01)
(Continued)

(52) U.S. Cl.
CPC ............ *H04W 52/58* (2013.01); *H04W 52/08* (2013.01); *H04W 52/146* (2013.01)

(58) Field of Classification Search
CPC .... H04W 52/58; H04W 52/08; H04W 52/146
(Continued)

(56) References Cited

U.S. PATENT DOCUMENTS

2008/0014951 A1* 1/2008 Laroia ................ H04W 72/042
455/450
2012/0250591 A1* 10/2012 Diao ...................... H04L 5/001
370/280

(Continued)

OTHER PUBLICATIONS

3GPP TS 36.211: "3rd Generation Partnership Project Technical Specification Group Radio Access Network, Evolved Universal Terrestrial Radio Access (E-UTRA), Physical Channels and Modulation (Release 12)", 3rd Generation Partnership Project (3GPP), Mobile Competence Centre, 650, Route Des Lucioles, F-06921 Sophia-Antipolis Cedex, France, vol. RAN WG1, No. V12.5.0, Mar. 16, 2015 (Mar. 16, 2015), pp. 1-136, XP050928082, [retrieved on Mar. 16, 2015] p. 11-p. 14.

(Continued)

*Primary Examiner* — Afsar M Qureshi
(74) *Attorney, Agent, or Firm* — Arent Fox LLP and Qualcomm Incorporated

(57) ABSTRACT

An efficient way to perform power control and to communicate data with a base station is desired. According to an aspect, the apparatus generates a downlink grant for a device, the downlink grant indicating to the device subsets of uplink resources allocated for transmitting data segments and subsets of downlink resources for receiving power control commands for respective data segments, the subsets of the uplink resources being non-concurrent with the subsets of the downlink resources. The apparatus transmits the downlink grant to the device. The apparatus receives, from the device, a first uplink transmission in a first subset of the uplink resources based on the transmitted downlink grant. The apparatus generates a first power control command based on the received first uplink transmission. The apparatus transmits, to the device, the first power control command in a first subset of the downlink resources. The apparatus may be a base station.

59 Claims, 18 Drawing Sheets

(51) Int. Cl.
*H04W 52/08* (2009.01)
*H04W 52/14* (2009.01)

(58) Field of Classification Search
USPC .......................................................... 370/329
See application file for complete search history.

(56) References Cited

U.S. PATENT DOCUMENTS

| 2013/0295976 | A1* | 11/2013 | Patil | H04W 24/10 |
| | | | | 455/501 |
| 2014/0376422 | A1* | 12/2014 | Dai | H04L 5/0053 |
| | | | | 370/280 |
| 2015/0087352 | A1 | 3/2015 | Lim et al. | |
| 2017/0142715 | A1* | 5/2017 | Li | H04W 72/0446 |

OTHER PUBLICATIONS

3GPP TS 36.213: "3rd Generation Partnership Project, Technical Specification Group Radio Access Network, Evolved Universal Terrestrial Radio Access (E-UTRA), Physical Layer Procedures (Release 12)", 3rd Generation Partnership Project (3GPP), Mobile Competence Centre, 650, Route Des Lucioles, F-06921 Sophia-Antipolis Cedex, France, vol. RAN WG1. No. V12.5.0, Mar. 25, 2015 (Mar. 25, 2015), pp. 1-239, XP050928106, [retrieved on Mar. 25, 2015] section 5.1.
International Search Report and Written Opinion—PCT/US2016/018622—ISA/EPO—May 3, 2016.

* cited by examiner

UPLINK SCHEDULING WITH POWER CONTROL COMMAND IN AN FDD HALF-DUPLEX NETWORK

CROSS-REFERENCE TO RELATED APPLICATION(S)

This application claims the benefit of U.S. Provisional Application Ser. No. 62/139,414, entitled "Uplink Scheduling with Power Control Command in an FDD Half-duplex Network" and filed on Mar. 27, 2015, which is expressly incorporated by reference herein in its entirety.

BACKGROUND

Field

The present disclosure relates generally to communication systems, and more particularly, to an uplink (UL) communication in a frequency division duplex network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

For efficient communication from a user device to a base station, an appropriate power control for the communication is desired. Therefore, an efficient way for a user device to perform power control of communication with the base station is desired. In addition, efficient use of communication resources is desired for data communication between the user device and the base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Generally, a device may control transmit power for communication to a base station based on a power control command included in a grant for a transmission block. However, performing transmit power control for the transmission block only when the device receives the grant may not be the most effective or efficient way for the transmit power control. Further, if the transmission block is large, the transmission block may occupy a lot of resources for transmission to the base station.

In an aspect of the disclosure, a method, a computer program product, and an apparatus are provided. The apparatus may be a base station. The apparatus generates a downlink grant for a device, the downlink grant indicating to the device subsets of uplink resources allocated for transmitting data segments and subsets of downlink resources for receiving power control commands for respective data segments, the subsets of the uplink resources being non-concurrent with the subsets of the downlink resources. The apparatus transmits the downlink grant to the device.

In an aspect, the apparatus may be a base station. The apparatus may include means for generating a downlink grant for a device, the downlink grant indicating to the device subsets of uplink resources allocated for transmitting data segments and subsets of downlink resources for receiving power control commands for respective data segments, the subsets of the uplink resources being non-concurrent with the subsets of the downlink resources. The apparatus may include means for transmitting the downlink grant to the device.

In an aspect, the apparatus may be a base station including a memory and at least one processor coupled to the memory. The at least one processor may be configured to: generate a downlink grant for a device, the downlink grant indicating to the device subsets of uplink resources allocated for transmitting data segments and subsets of downlink resources for receiving power control commands for respective data segments, the subsets of the uplink resources being non-concurrent with the subsets of the downlink resources, and transmit the downlink grant to the device.

In an aspect, a computer-readable medium storing computer executable code for a base station may comprise code to: generate a downlink grant for a device, the downlink grant indicating to the device subsets of uplink resources allocated for transmitting data segments and subsets of downlink resources for receiving power control commands for respective data segments, the subsets of the uplink resources being non-concurrent with the subsets of the downlink resources, and transmit the downlink grant to the device.

In another aspect of the disclosure, a method, a computer program product, and an apparatus are provided. The apparatus may be a device. The device may divide a transmission block of data into data segments. The device may transmit a request for uplink resources for communicating the data segments. The device may receive a downlink grant for the device, the downlink grant indicating to the device subsets of uplink resources allocated for transmitting the data segments and subsets of downlink resources for receiving power control commands for respective data segments, the subsets of the uplink resources being non-concurrent with the subsets of the downlink resources.

In an aspect, the apparatus may be a device. The device may include means for dividing a transmission block of data into data segments. The device may include means for transmitting a request for uplink resources for communicating the data segments. The device may include means for receiving a downlink grant for the device, the downlink grant indicating to the device subsets of uplink resources allocated for transmitting the data segments and subsets of downlink resources for receiving power control commands for respective data segments, the subsets of the uplink resources being non-concurrent with the subsets of the downlink resources.

In an aspect, the apparatus may be a device including a memory and at least one processor coupled to the memory. The at least one processor may be configured to: divide a transmission block of data into data segments, transmit a request for uplink resources for communicating the data segments, and receive a downlink grant for the device, the downlink grant indicating to the device subsets of uplink resources allocated for transmitting the data segments and subsets of downlink resources for receiving power control commands for respective data segments, the subsets of the uplink resources being non-concurrent with the subsets of the downlink resources.

In an aspect, a computer-readable medium storing computer executable code for a device may comprise code to: divide a transmission block of data into data segments, transmit a request for uplink resources for communicating the data segments, and receive a downlink grant for the device, the downlink grant indicating to the device subsets of uplink resources allocated for transmitting the data segments and subsets of downlink resources for receiving power control commands for respective data segments, the subsets of the uplink resources being non-concurrent with the subsets of the downlink resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
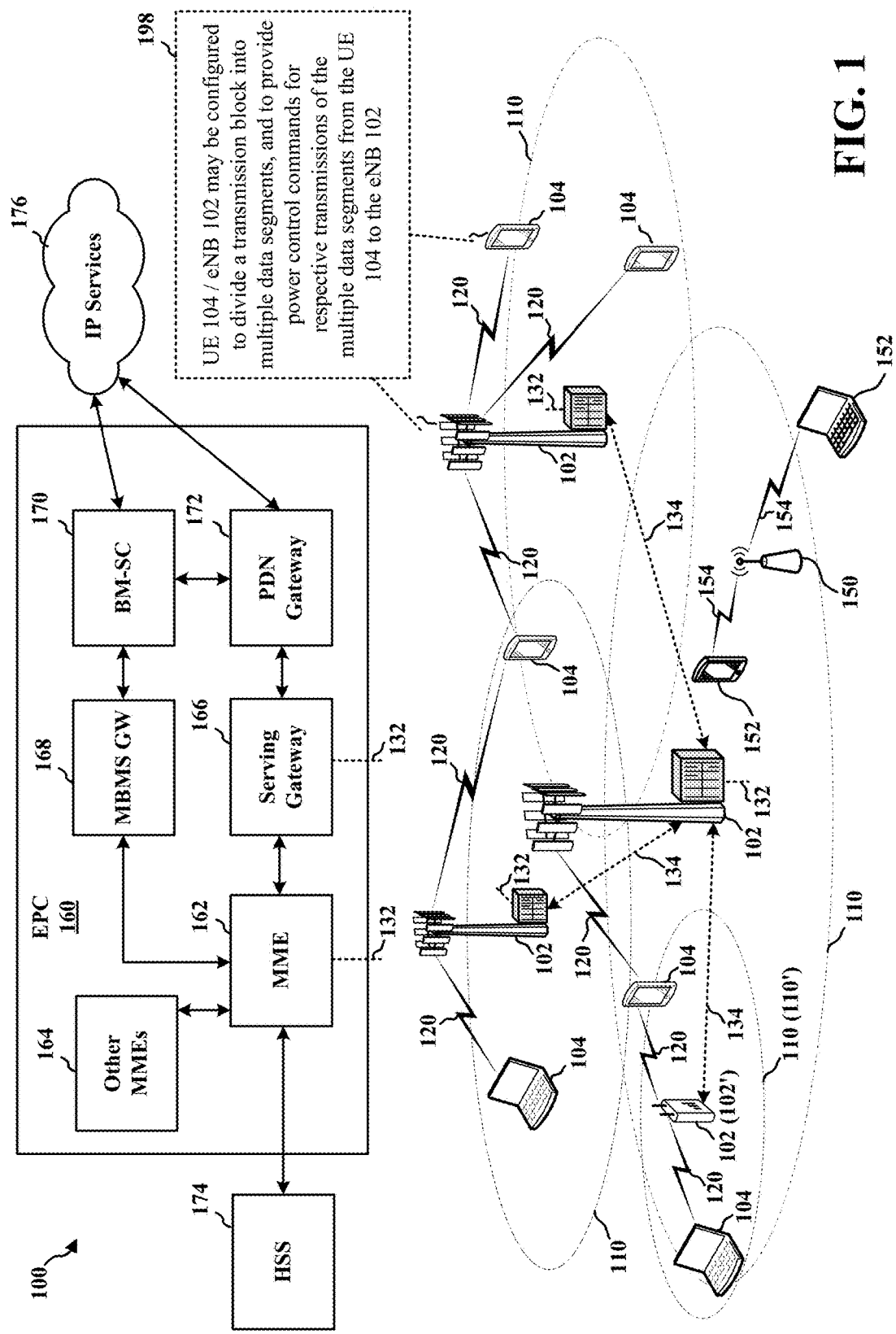
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to divide a transmission block into multiple data segments, and to provide power control commands for respective transmissions of the multiple data segments from the UE 104 to the eNB 102, such that the eNB 102 may decode the transmission block based on the multiple data segments (198).

Figure 2:
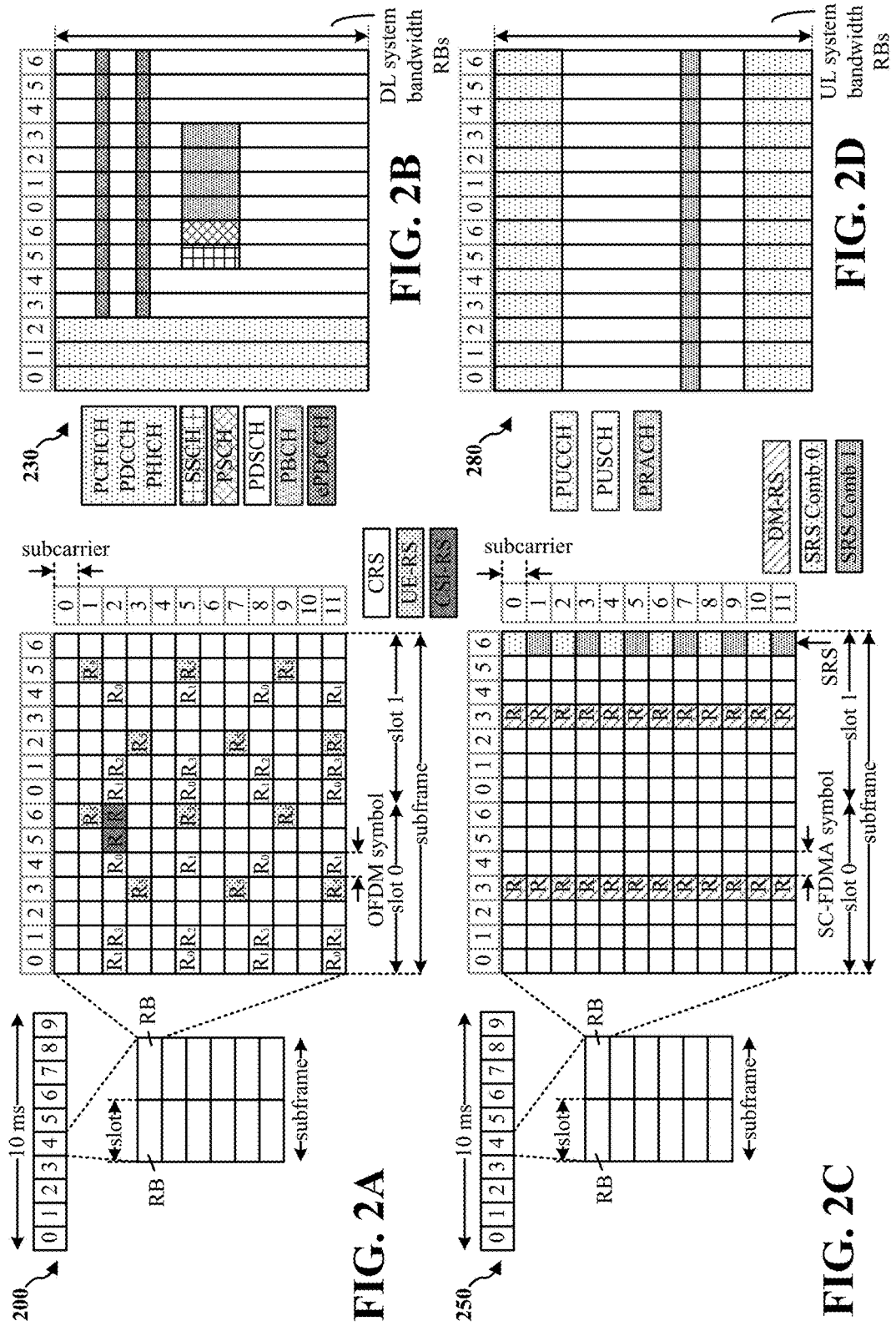
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
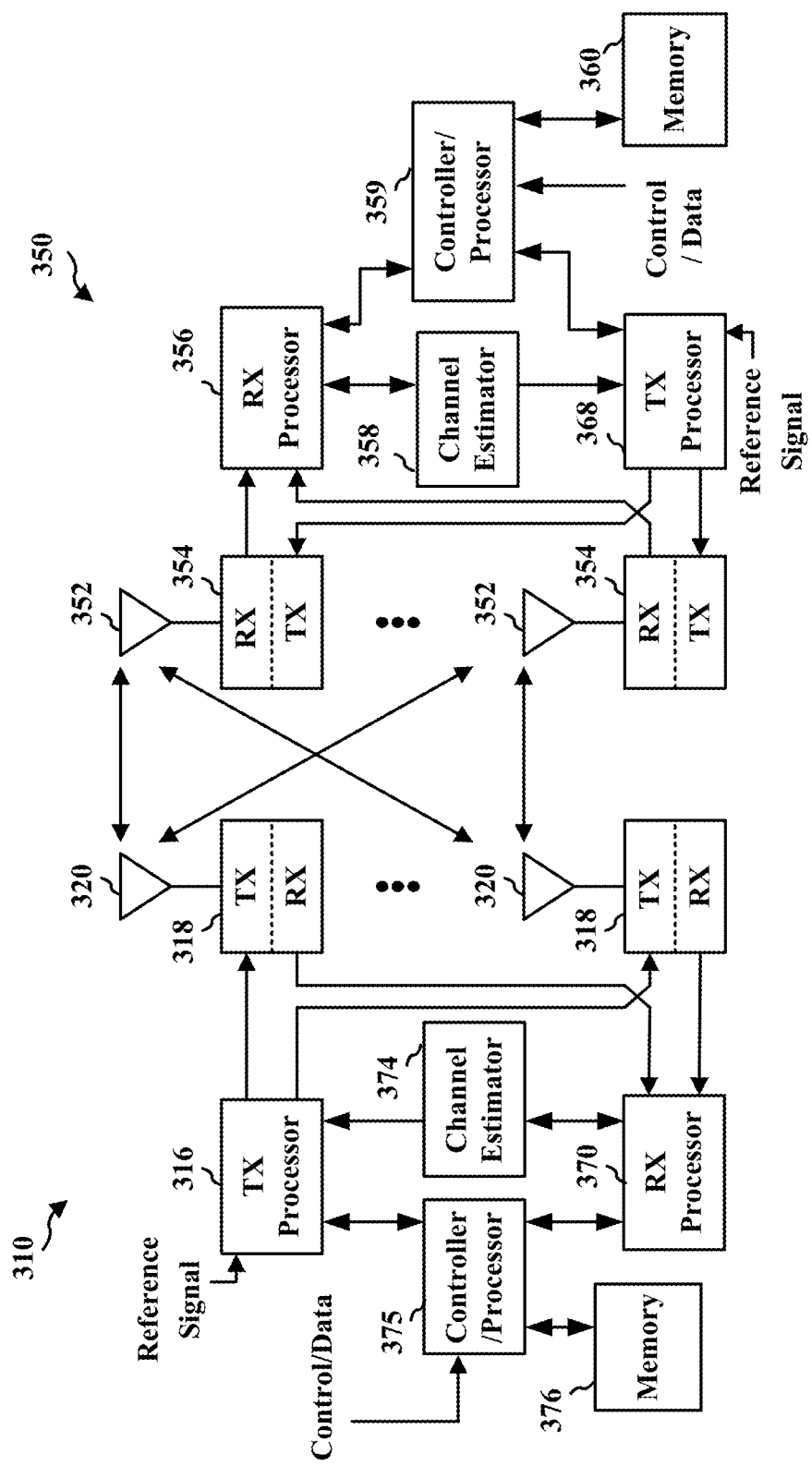
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Recently, an Internet of Things (IoT) system has been studied in GERAN. The IoT system may involve an IoT device and a base station and may operate within a narrow bandwidth (e.g., 200 KHz). The IoT system may work in an FDD half-duplex mode. For the IoT system, an OFDMA-based design where available downlink/uplink bandwidth is divided in a number of spaced tones may be implemented.

The IoT system may experience a large path loss to a base station. For example, the large path loss may be caused by IoT devices that are remote from the base station or IoT devices located in a certain area/structure (e.g., basement) where signals cannot be effectively communicated. The IoT system should provide reliable communication even when experiencing the path loss that may cause a low signal-to-noise ratio (SNR). To provide reliable communication in a low SNR condition (e.g., due to the path loss), a base station may use large coding blocks to transmit data to an IoT device. For example a coding block may be considered large if a transmission time to complete transmission of the coding block is long (e.g., more than 1 second). In the low SNR condition, repetition of transmission of the large coding blocks may be performed for successful communication of data to the IoT device (e.g., because the large coding blocks may not be successfully transmitted in one attempt in the low SNR condition). The IoT device may utilize high transmit power to transmit large coding blocks, and thus such large coding blocks may cause difficulty in resource allocation to meet a desirable system capacity. Because the base station is limited with resources (e.g., frequency resources and power), an efficient technique for UL communication is desired.

Figure 4:
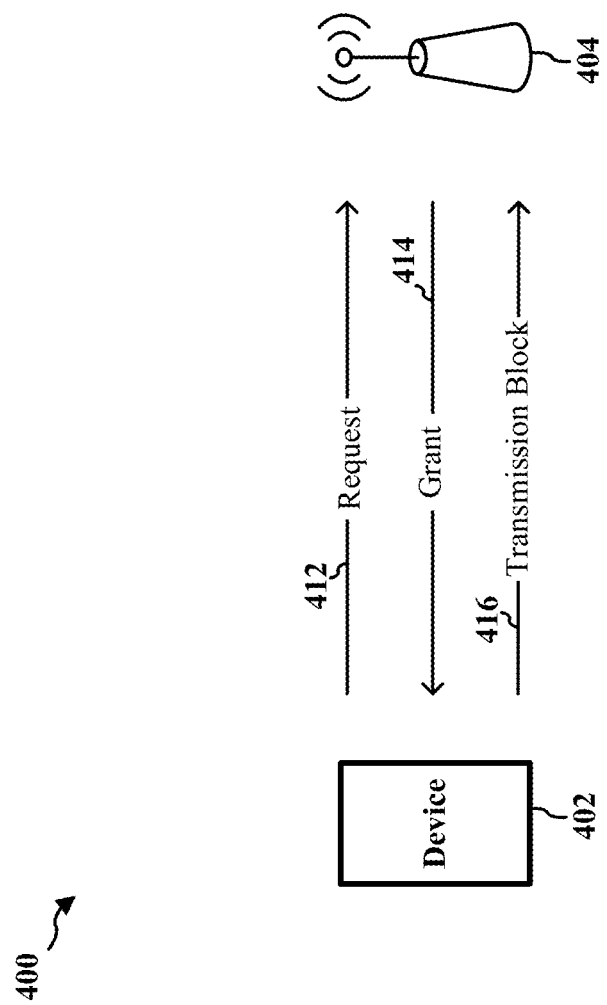
FIG. 4 is an example diagram illustrating uplink communication from a device to a base station.

FIG. 4 is an example diagram 400 illustrating uplink communication from a device to a base station. If a device (e.g., IoT device) 402 has UL data to send to a base station 404, the device 402 may transmit a random access request 412 to the base station 404, in order to indicate to the base station 404 that the device 402 requests UL resources to transmit the UL data to the base station 404. In response to the random access request 412, the base station 404 transmits a grant 414 to the device 402 on a downlink (DL) frequency band. The grant 414 transmitted to the device 402 may assign resources for a UL frequency band for the UL transmission. The device 402 utilizes the UL frequency band based on the grant 414 in order to transmit UL data in a transmission block 416.

If the device maintains the transmit power to high power, the device is likely to be able to perform successful UL transmission. However, if the device maintains such high transmit power, the device will consume more power and/or is also likely to interfere with other neighbor devices' communication by signals transmitted in high transmit power. On the other hand, if the device maintains low transmit power, the transmit power may not be high enough to successfully perform UL transmission. Thus, the device may adjust the transmit power of the device based on the path loss to the base station, in order to ensure that the device's UL transmission is successfully received and decoded at the base station. However, more efficient approach to adjust the device transmit power for successful UL transmission may be explored.

The base station may include a power control command in the grant transmitted to the device, along with UL resource assignment information. The base station may generate the power control command based on a previous UL transmission to the base station, to indicate a power level for transmit power of the device. Thus, when the device receives the grant, the device may control the transmit power for UL transmission based on the power control command included in the grant. However, if the power control based on the power control command is performed only when the device receives a grant, the power control may not provide the most efficient and effective transmit power for the device throughout UL transmission of a transmission block because transmission conditions may change throughout the UL transmission of the transmission block (e.g., a channel change). For example, if the power control is performed only when the device receives a grant and transmission conditions change between a grant and a subsequent grant, the device may not perform power control to reflect such a change until the subsequent grant is received. Further, if a device attempts to transmit a large transmission block, the large transmission block may occupy a lot of resources and may not be transmitted at the best transmit power, causing inefficiency in resource and power usages.

According to the disclosure, instead of attempting to transmit an entire transmission block at once, the device divides the transmission block into several segments and transmits each segment separately, while receiving updated power control commands between transmissions of the segments (e.g., during inter-segment intervals). In order to implement such features, the base station transmits to the device a grant that includes UL resources for multiple segments of a transmission block. In particular, for each segment of the transmission block, the grant specifies which portion of the UL resources should be used to transmit a corresponding segment. The UL resources may be non-concurrent UL resources allocated for transmission of the multiple segments of the transmission block. The grant further includes DL resources for the multiple power control commands. In particular, for each control command, the grant specifies which portion of the DL resources should be used to receive a corresponding power control command. The DL resources may be non-concurrent DL resources for receiving power control commands for respective segments of the transmission block. Resources should be allocated so that there is enough time for the device to change transmission and read resources on the DL band. The grant may also include an initial power control command that the UE may use to adjust transmit power for a first transmission after the grant is received (e.g., transmission of the first segment of the transmission block). The initial power control command included in the grant may specify a predetermined power (e.g., a low power, a full power, or medium power) or may be based on previous UL transmission prior to transmission of a current transmission block. It is noted that the grant may also include a modulation and coding scheme (MCS).

When the base station receives transmission of a segment, the base station may estimate the transmit power sufficient for the device, in order to generate a power control command for the device's UL transmission of a subsequent segment. According to the disclosure, because the power control command provides power control based on UL transmission of a previous segment and multiple power control commands are provided based on multiple transmissions of the segments throughout UL transmission of the transmission block, the power control of the device transmit power according to the disclosure provides reliable UL communication by regularly updating the power control of the device. In other words, based on multiple power control commands that are received between UL transmissions of the segments of the transmission block, the device adjusts the transmit power multiple times throughout the transmission of the transmission block. For example, for each power control command received at the device, the device may adjust the transmit power based on a corresponding power control command received most recently. Thus, the device may transmit with the device transmit power that is updated multiple times by the multiple power control commands throughout the transmission of the transmission block.

When the device divides the transmission block into multiple segments, the device may divide the transmission block based on sizes of the segments specified by the base station. In particular, the base station determines the size of each segment, and transmits size information including sizes of the segments to the device. The base station may determine the size of each segment based on one or more factors including traffic of the system, a path loss, SNR, the message size the device wants to transmit. For example, if the path loss is large and/or the SNR is low, then the base station may set the size of each segment to be larger. On the other hand, for example, if the path loss is small and/or the SNR is high, then the base station may set the size of each segment to be smaller.

Figure 5:
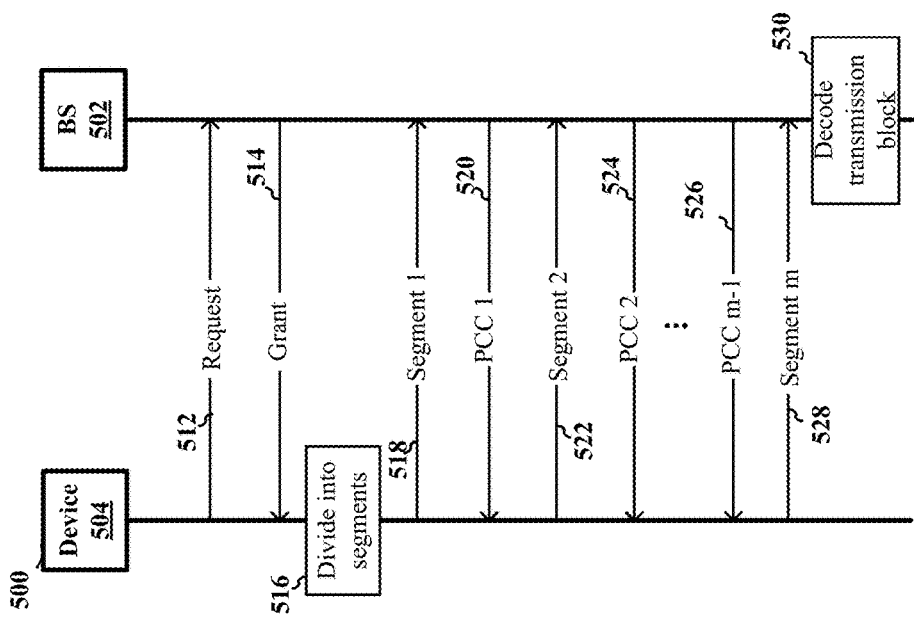
FIG. 5 is an example flow diagram illustrating an aspect of the disclosure.

FIG. 5 is an example flow diagram 500 illustrating an aspect of the disclosure. In the example flow diagram 500, the base station 502 and the device 504 communicate with each other to perform UL communication of a transmission block. The device 504 may be an IoT device. At 512, the device 504 transmits a random access request 512 indicating that the device 504 requests UL resources to perform UL transmission. In response to the random access request 512, the base station 502 transmits a grant 514 to the device 504. The grant 514 may be generated by the base station 502. The grant may include portions (subsets) of UL resources for UL transmissions of segments of the transmission block, and may include portions (subsets) of DL resources for DL transmissions of control commands. The grant may further include an initial power control command for the first segment of the transmission block. At 516, the device 504 divides the transmission block into multiple segments. The transmission block may be divided into multiple segments based on sizes of segments indicated by the base station 502. At 518, the device 504 performs a first UL transmission by transmitting (e.g., in subset 1 of the UL resources) the first segment (Segment 1) of the transmission block to the base station 502, based on the transmit power level indicated in the initial power control command. At 520, the base station 502 generates a first power control command (PCC 1) based on the first transmission and transmits the first power control command to the device 504 (e.g., in subset 1 of the DL resources). At 522, the device 504 performs a second UL transmission by transmitting (e.g., in subset 2 of the UL resources) a second segment (Segment 2) of the transmission block based on the transmit power level indicated in the first power control command, to the base station 502. At 524, the base station 502 generates a second power control command (PCC 2) based on the second transmission and transmits the second power control command to the device 504 (e.g., in subset 2 of the DL resources).

The process of generating and transmitting a power control command by the base station 502, and transmitting a segment based on the power control command is repeated until the base station 502 receives all of the segments of the transmission block. In the example flow diagram 500, there are m segments of the transmission block. Thus, after receiving (m−2) segments from the device 504, at 526, the base station 502 generates a $(m-1)^{th}$ power control command (PCC m−1) based on the $(m-2)^{th}$ transmission from the device 504 and transmits the $(m-1)^{th}$ power control command to the device 504 (e.g., in subset (m−1) of the DL resources). At 528, the device 504 performs a second UL transmission by transmitting (e.g., in subset m of the UL resources) an $m^{th}$ segment (Segment m) of the transmission block based on the transmit power level indicated in the $(m-1)^{th}$ power control command, to the base station 502. At 530, after receiving all m segments of the transmission block, the base station 502 may decode the transmission block based on the received m segments.

Figure 6:
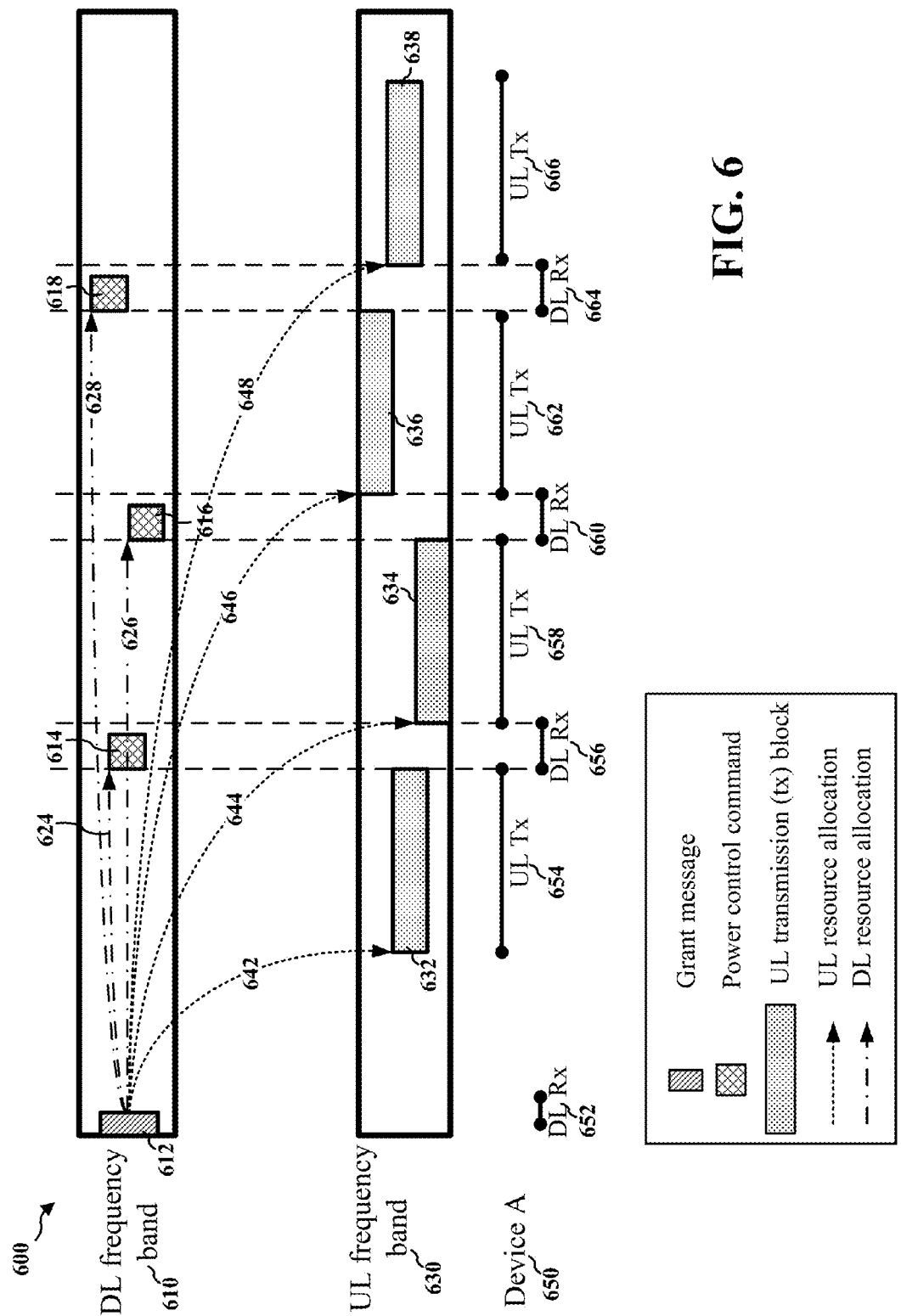
FIG. 6 is an example resource timeline diagram illustrating an aspect of the disclosure.

FIG. 6 is an example resource timeline diagram 600 illustrating an aspect of the disclosure. The example resource timeline diagram 600 provides details on the usage of DL resources (DL frequency band 610) and UL resources (UL frequency band 630), as well as resource allocation time line for Device A 650. During an initial DL period 642, the base station transmits a grant 612. The grant 612 may include UL resource allocation periods (UL periods) 642, 644, 646, and 648 for first, second, third, and fourth segments 632, 634, 636, and 638, respectively. The grant 612 may also include DL resource allocations 624, 626, and 628 for first, second, and third power control commands 614, 616, and 618, respectively. The grant 612 may further include an initial power control command, such that the device may perform the first UL transmission based on the initial power control command.

During a first UL period 654, the device performs a first UL transmission by transmitting a first segment 632 of the transmission block to the base station, based on the initial power control command. The base station generates a first power control command 614 based on the first UL transmission. During a first DL period 656, the base station transmits the first power control command 614 to the device. After the first DL period 656, during a second UL period 658, the device performs a second UL transmission by transmitting a second segment 634 of the transmission block to the base station, based on the first power control command 614. During a second DL period 660, the base station transmits the second power control command 616 to the device, where the second power control command 616 is generated by the base station based on the second UL transmission. During a third UL period 662, the device performs a third UL transmission by transmitting a third segment 636 of the transmission block to the base station, based on the second power control command 616. During a third DL period 664, the base station transmits the third power control command 618 to the device, where the third power control command 618 is generated by the base station based on the third UL transmission. During a fourth UL period 666, the device performs a fourth UL transmission by transmitting a fourth segment 638 of the transmission block to the base station, based on the third power control command 618. Subsequently, similar processes may be performed until all of the segments are transmitted from the device to the base station.

In an additional aspect of the disclosure, UL resource management in a half-duplex mode may be improved by multiplexing UL segments and power control commands of different devices. In the half-duplex mode, during a DL period when a device performs DL communication, the device cannot perform UL communication and thus fails to utilize the UL resources during such DL period. Therefore, an approach to utilize the UL resources while the device performs DL communication is desired, in order to avoid wasting usages of the UL resources. Further, in the half-duplex mode, during a UL period when the device performs UL communication, the device cannot perform DL communication and thus fails to utilize the DL resources during such UL period. Therefore, an approach to utilize the DL resources while the device performs UL communication may also be desired, in order to avoid wasting usages of the DL resources.

According to the additional aspect of the disclosure, during a DL period when a first device performs DL communication, a second device may utilize the UL resources to perform UL communication from the second device. Thus, wasting the UL resources during the DL communication by the first device may be avoided. Further, during a UL period when the first device performs UL communication, the second device may utilize the DL resources to receive DL communication at the second device, to avoid wasting the DL resources during the DL communication by the first device. In one example, during a UL period of the first device, the second device may perform DL communication to receive a power control command while the first device performs UL communication to transmit a data segment.

Figure 7:
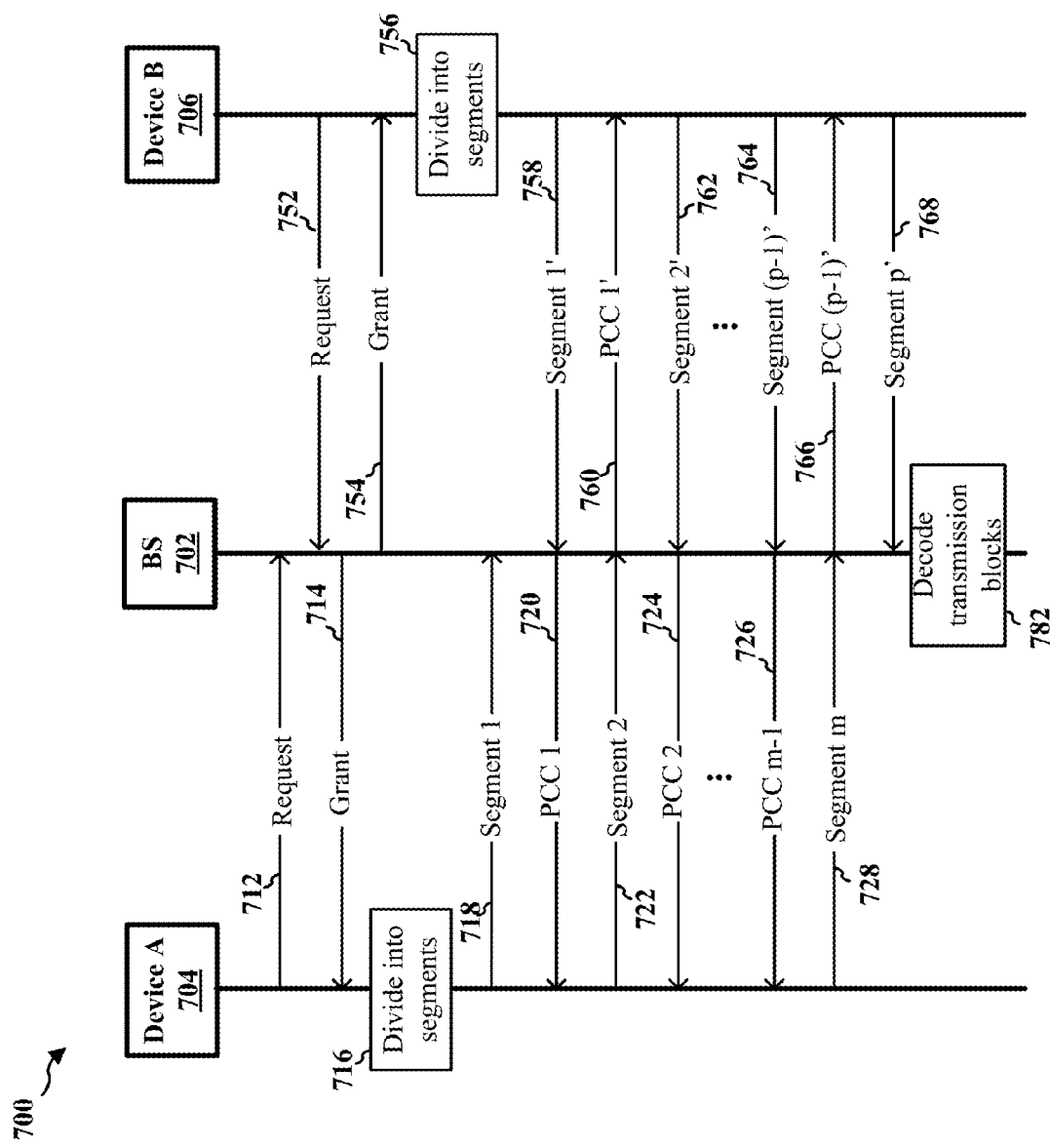
FIG. 7 is an example flow diagram illustrating the additional aspect of the disclosure

FIG. 7 is an example flow diagram 700 illustrating the additional aspect of the disclosure. In the example flow diagram 700, the base station 702 communicates with a first device (Device A) 704 to receive UL communication of a first transmission block, and communicates with a second device (Device B) 706 to receive UL communication of a second transmission block. The first device 704 and/or the second device 706 may be IoT devices. With regard to communication between the base station 702 and the first device 704, the features performed at 712-728 are similar to the features performed at 512-528 of FIG. 5 for the communication between the base station 502 and the device 504, and thus detailed explanations of the features performed at 712-728 are omitted for brevity.

With regard to communication between the base station 702 and the second device 706, at 752, the second device 706 transmits a random access request 752 indicating that the second device 706 requests UL resources to perform UL transmission. In response to the random access request 752, the base station 702 transmits a grant at 754 to the second device 706. The grant 754 may be generated by the base station 502. The grant may include portions (subsets) of UL resources for UL transmissions of segments of the transmission block, and may include portions (subsets) of DL resources for DL transmissions of control commands. The grant may further include an initial power control command for the first segment of the transmission block. At 756, the second device 706 divides the transmission block into multiple segments. The transmission block may be divided into multiple segments based on sizes of segments indicated by the base station 702.

At 758, the second device 706 performs a first UL transmission by transmitting (e.g., in subset 1' of the UL resources) the first segment (Segment 1') of a second transmission block to the base station 702, based on the transmit power level indicated in the initial power control command. It is noted that, the base station 702 transmits at 720 the first power control command (PCC 1) for the first device 704 on a subset of DL resources (e.g., subset 1 of the DL resources) while receiving at 758 the first segment (Segment 1') of the second transmission block from the second device 706 on a subset of UL resources (e.g., subset 1' of the UL resources). At 760, the base station 702 generates a first power control command (PCC 1') based on the first transmission and transmits the first power control command to the second device 706 (e.g., in subset 1' of the DL resources). It is noted that, the base station 702 transmits at 760 the first power control command (PCC 1') for the second device 706 on a subset of DL resources (e.g., in subset 1' of the DL resources) while receiving at 722 the second segment (Segment 2) of the first transmission block from the first device 704 on a subset of UL resources (e.g., in subset 2 of the UL resources). At 762, the second device 706 performs a second UL transmission by transmitting (e.g., in subset 2' of the UL resources) a second segment (Segment 2') of the second transmission block based on the transmit power level indicated in the first power control command, to the base station 702. It is noted that, the base station 702 transmits at 724 the second power control command (PCC 2) for the first device 704 on a subset of DL resources (e.g., in subset 2 of the DL resources) while receiving at 762 the second segment (Segment 2') of the second transmission block from the second device 706 on a subset of UL resources (e.g., in subset 2' of the UL resources).

The process of generating and transmitting a power control command by the base station 702, and transmitting a segment based on the power control command is repeated until the base station 702 receives all of the segments of the second transmission block from the second device 706. In the example flow diagram 700, there are p segments of the second transmission block. Thus, at 764, the second device 706 performs a $(p-1)^{th}$ UL transmission by transmitting (e.g., in subset $(p-1)'$ of the UL resources) a $(p-1)^{th}$ segment (Segment $(p-1)'$) of the second transmission block based on the transmit power level indicated in the $(p-2)^{th}$ power control command, to the base station 702. It is noted that, the base station 702 transmits at 726 the $(m-1)^{th}$ power control command (PCC m-1) for the first device on a subset of DL resources (e.g., in subset (m-1) of the UL resources) while receiving at 764 the $(p-1)^{th}$ segment (Segment $(p-1)'$) of the second transmission block from the second device 706 on a subset of UL resources (e.g., in subset $(p-1)'$ of the UL resources). At 766, the base station 702 generates a $(p-1)^{th}$ power control command (PCC $(p-1)'$) for the second device 706 based on the $(p-1)^{th}$ transmission and transmits the $(p-1)^{th}$ power control command to the second device 706. It is noted that the base station 702 transmits at 766 $(p-1)^{th}$ power control command (PCC $(p-1)'$) for the second device 706 on a subset of DL resources (e.g., in subset $(p-1)'$ of the DL resources) while receiving at 728 the $m^{th}$ segment (Segment m) of the first transmission block from the first device 704 on a subset of UL resources (e.g., in subset m of the UL resources). At 768, the second device 706 performs a $p^{th}$ UL transmission by transmitting an $p^{th}$ segment (Segment p') of the second transmission block based on the transmit power level indicated in the $(p-1)^{th}$ power control command, to the base station 702. At 782, after receiving all m segments of the first transmission block from the first device 704 and all p segments of the second transmission block from the second device 706, the base station 702 may decode the first and second transmission blocks based on the received m segments and p segments.

Figure 8:
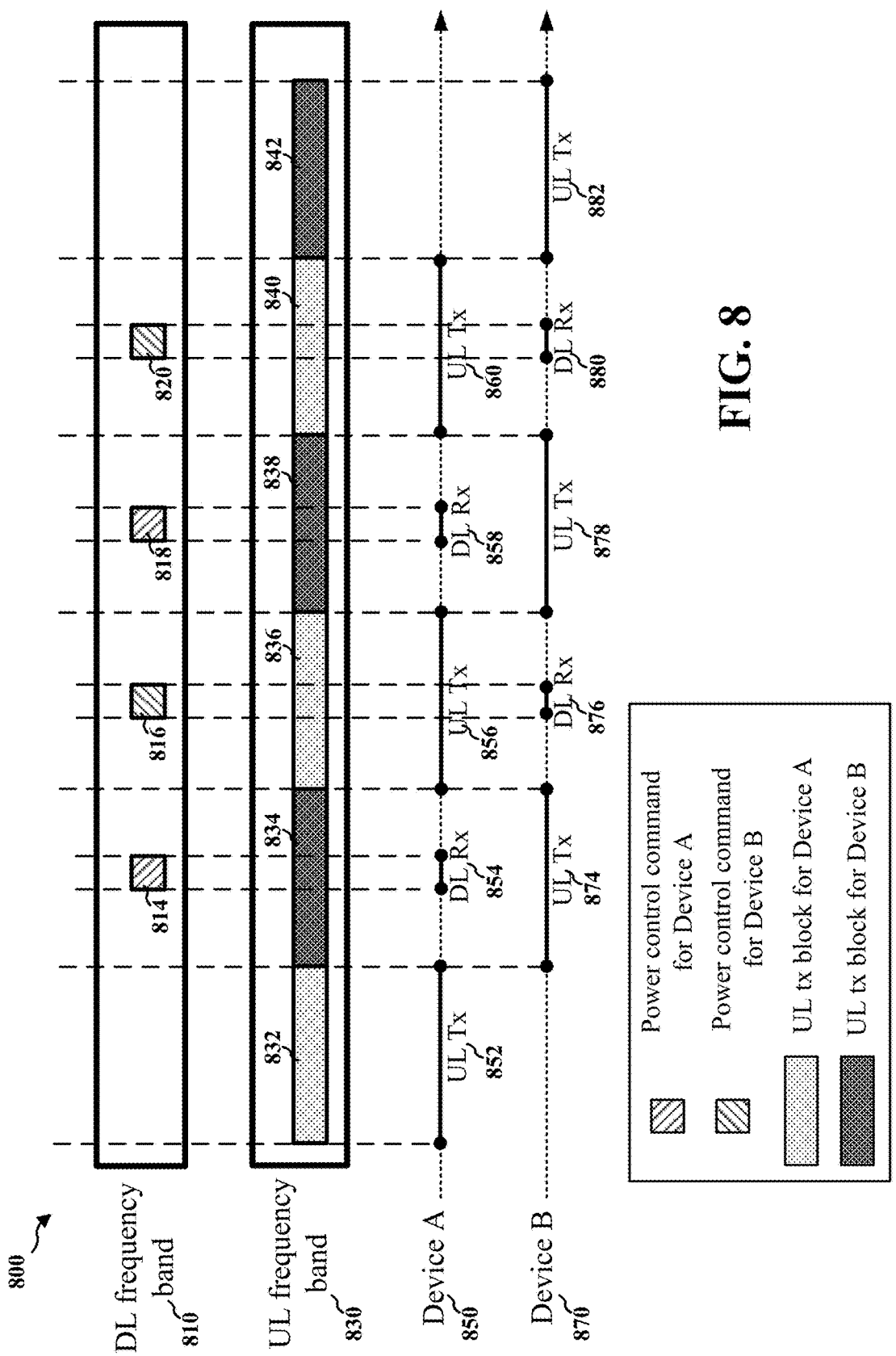
FIG. 8 is an example resource timeline diagram illustrating the additional aspect of the disclosure.

FIG. 8 is an example resource timeline diagram 800 illustrating the additional aspect of the disclosure. The example resource timeline diagram 800 provides details on the usage of DL resources (DL frequency band 810) and UL resources (UL frequency band 830) by a first device (Device A) and a second device (Device B), as well as resource allocation time line for the first device 850 and resource time line for the second device 870. In the example resource timeline diagram 800, the first transmission block is divided into three segments 832, 836, and 840, and the second transmission block is divided into three segments 834, 848, and 842.

During a first UL period 852, the first device performs a first transmission by transmitting a first segment 832 of the first transmission block to the base station. The first device may transmit the first segment 832 based on an initial power control command included in a grant received from the base station. The base station generates a first power control command 814 based on the first UL transmission from the first device. During a first DL period 854, the base station transmits the first power control command 814 to the first device. The first DL period 854 exists within a second UL period 874, where the second device performs during the second UL period 874 a second UL transmission by transmitting a first segment 834 of the second transmission block to the base station. Thus, the first device receives the first power control command 814 using a portion of the DL frequency band while the second device transmits the first segment 834 of the second transmission block using a portion of the UL frequency band. After the second UL period 874, during a third UL period 856, the device performs a third UL transmission by transmitting a second segment 836 of the first transmission block to the base station, based on the first power control command 814. During a second DL period 876, the base station generates a second power control command 816 based on the second transmission, and transmits the second power control command 816 to the second device, where the second DL period 876 exists within the third UL period 856. Thus, the second device receives the second power control command 816 using a portion of the DL frequency band while the first device transmits the second segment 836 of the first transmission block using a portion of the UL frequency band.

During a third DL period 858, the base station generates a third power control command 818 based on the third transmission and transmits the third power control command 818 to the first device. The third DL period 858 exists within a fourth UL period 878, where the second device performs during the fourth UL period 878 a fourth transmission by transmitting a second segment 838 of the second transmission block to the base station. Thus, the first device receives the third power control command 818 while the second device transmits the second segment 838 of the second transmission block. After the fourth UL period 878, during a fifth UL period 860, the device performs a fifth transmission by transmitting a third segment 840 of the first transmission block to the base station, based on the third power control command 818. During a fourth DL period 880, the base station generates a fourth power control command 820 based on the fourth transmission, and transmits the fourth power control command 820 to the second device, where the fourth DL period 880 exists within the fifth UL period 860. Thus, the second device receives the fourth power control command 820 while the first device transmits the third segment 840 of the first transmission block. At a sixth UL period 882, the device performs a sixth transmission by transmitting a third segment 842 of the second transmission block to the base station, based on the fourth power control command 820.

In summary, when the first device is not utilizing the UL resources, the second device utilizes the UL resources during the second UL period 874, the fourth UL period 878, and the sixth UL period 882, to transmit segments of the second transmission block. Further, when the second device is not utilizing the UL resources, the first device utilizes the UL resources during the first UL period 852, the third UL period 856, and the fifth UL period 860, to transmit segments of the first transmission block.

Figure 9:
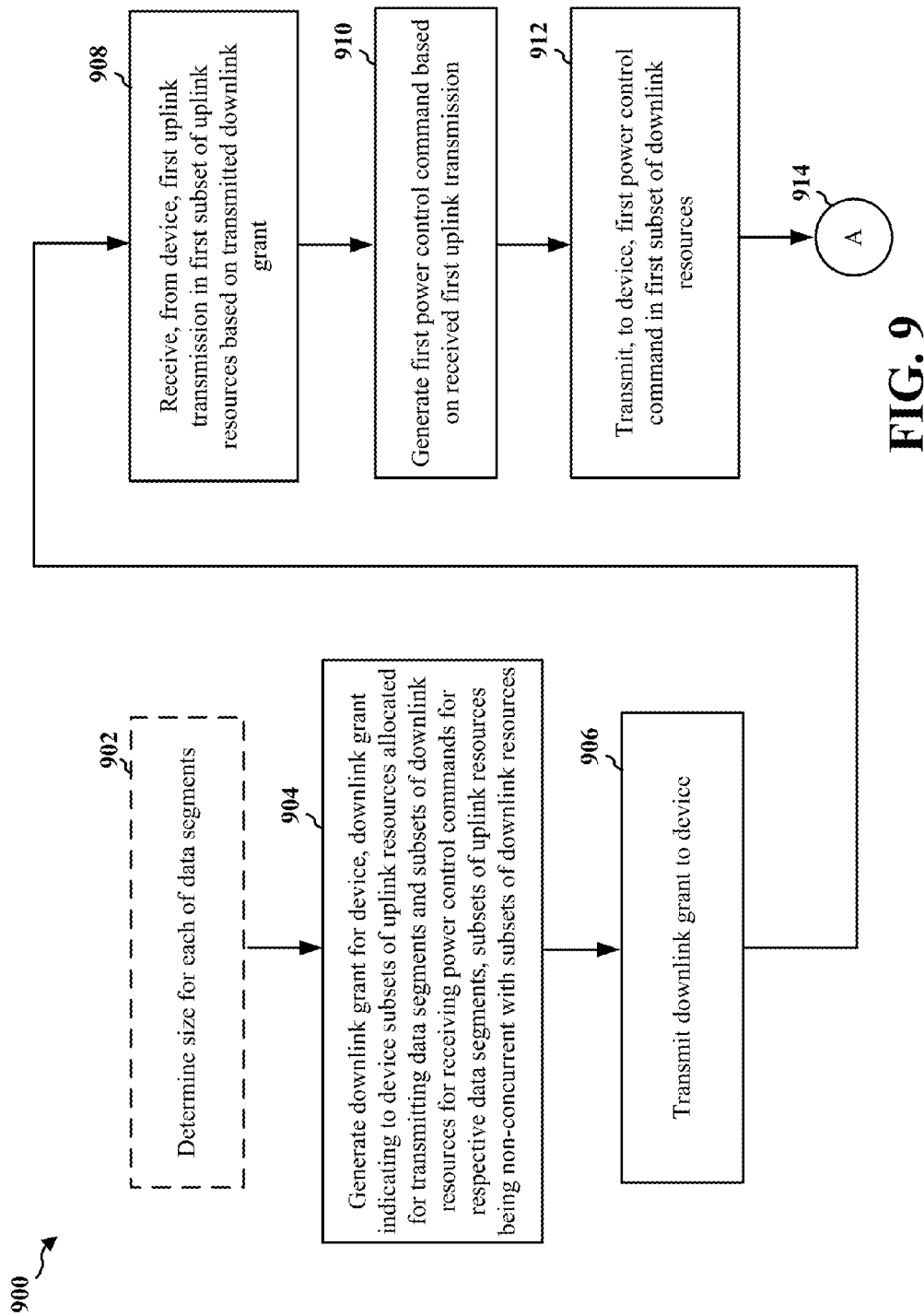
FIG. 9 is a flow chart of a method of wireless communication, according to an aspect of the disclosure.

FIG. 9 is a flow chart 900 of a method of wireless communication, according to an aspect of the disclosure. The method may be performed by a base station (e.g., the base station 502, the apparatus 1302/1302'). At 902, the base station may determine a size for each of the data segments. For example, as discussed supra, the base station may determine the size of each segment, and transmit size information including sizes of the segments to the device.

At 904, the base station generates a downlink grant for a device, the downlink grant indicating to the device subsets of uplink resources allocated for transmitting data segments and subsets of downlink resources for receiving power control commands for respective data segments, the subsets of uplink resources being non-concurrent with the subsets of downlink resources. For example, as discussed supra, the base station transmits to the device a grant that includes UL resources for multiple segments of a transmission block. In particular, for each segment of the transmission block, the grant specifies which portion of the UL resources should be used to transmit a corresponding segment. For example, referring back to FIG. 5, the grant 514 may be generated by the base station 502, and may include portions (subsets) of UL resources for UL transmissions of segments of the transmission block, and may include portions (subsets) of DL resources for DL transmissions of control commands. In an aspect, subsets of uplink resources are allocated for transmitting data segments based on size for each of data segments. For example, as discussed supra, when the device divides the transmission block into multiple segments, the device may divide the transmission block based on sizes of the segments specified by the base station. In an aspect, the size of each of the data segments is determined based on at least one of data traffic, path loss to the device, a size of a transmission block, or a noise level. For example, as discussed supra, the base station may determine the size of each segment based on one or more factors including traffic of the system, a path loss, SNR, the message size the device wants to transmit.

At 906, the base station transmits the downlink grant to the device. For example, as discussed supra, the base station transmits to the device a grant that includes UL resources for multiple segments of a transmission block. For example, referring back to FIG. 5, in response to the random access request 512, the base station 502 transmits a grant 514 to the device 504. In an aspect, the downlink grant includes a power control command for a first uplink transmission in a first subset of the uplink resources. For example, as discussed supra, the grant further includes DL resources for the multiple power control commands At 908, the base station receives, from the device, a first uplink transmission in a first subset of the uplink resources based on the transmitted downlink grant. For example, referring back to FIG. 5, at 518, the device 504 performs a first UL transmission by transmitting (e.g., in subset 1 of the UL resources) the first segment (Segment 1) of the transmission block to the base station 502, based on the transmit power level indicated in the initial power control command, where the grant may further include an initial power control command for the first segment of the transmission block.

At 910, the base station generates a first power control command based on the received first uplink transmission. At 912, the base station transmits, to the device, the first power control command in a first subset of the downlink resources. For example, referring back to FIG. 5, at 520, the base station 502 generates a first power control command (PCC 1) based on the first transmission and transmits the first power control command to the device 504 (e.g., in subset 1 of the DL resources). At 914, one or more additional methods discussed infra may be performed.

Figures 10A, 10B:
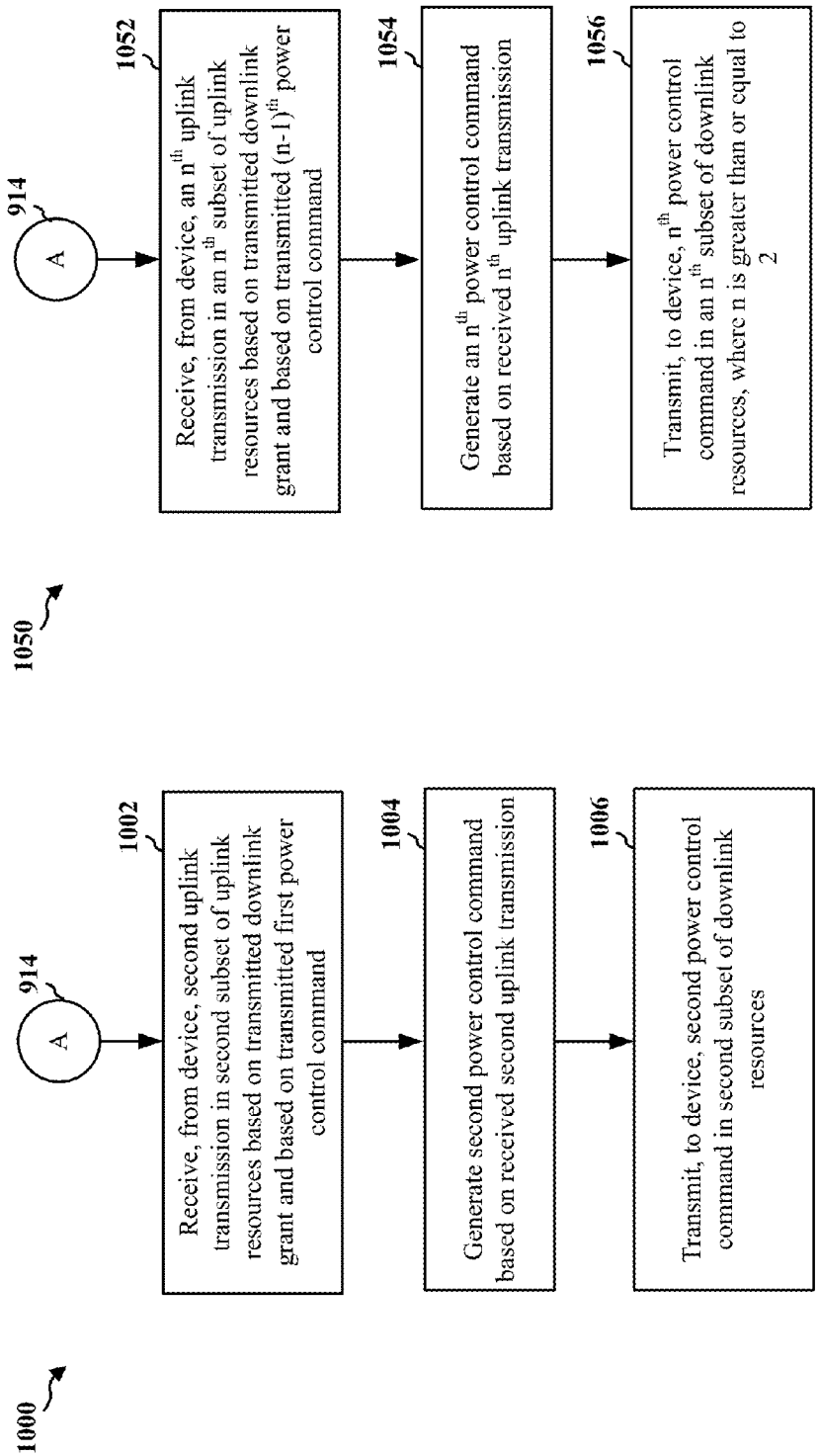
FIG. 10A is a flow chart of a method of wireless communication expanding from the flow chart of FIG. 9, according to an aspect of the disclosure.
FIG. 10B is a flow chart of a method of wireless communication expanding from the flow chart of FIG. 9, according to an aspect of the disclosure.

FIG. 10A is a flow chart 1000 of a method of wireless communication expanding from the flow chart 900 of FIG. 9, according to an aspect of the disclosure. The method may be performed by a base station (e.g., the base station 502, the apparatus 1302/1302'). The flow chart 1000 expands from 914 of FIG. 9.

At 1002, the base station receives, from the device, a second uplink transmission in a second subset of the uplink resources based on the transmitted downlink grant and based on the transmitted first power control command. For example, referring back to FIG. 5, at 522, the device 504 performs a second UL transmission by transmitting (e.g., in subset 2 of the UL resources) a second segment (Segment 2) of the transmission block based on the transmit power level indicated in the first power control command, to the base station 502.

At 1004, the base station generates a second power control command based on the received second uplink transmission. At 1006, the base station transmits, to the device, the second power control command in a second subset of the downlink resources. For example, referring back to FIG. 5, at 524, the base station 502 generates a second power control command (PCC 2) based on the second transmission and transmits the second power control command to the device 504 (e.g., in subset 2 of the DL resources).

FIG. 10B is a flow chart 1050 of a method of wireless communication expanding from the flow chart 900 of FIG. 9, according to an aspect of the disclosure. The method may be performed by a base station (e.g., the base station 502, the apparatus 1302/1302'). The flow chart 1000 expands from 914 of FIG. 9.

At 1052, the base station receives, from the device, an $n^{th}$ uplink transmission in an $n^{th}$ subset of the uplink resources based on the transmitted downlink grant and based on transmitted $(n-1)^{th}$ power control command. At 1054, the base station generates an $n^{th}$ power control command based on the received $n^{th}$ uplink transmission. At 1056, the base station transmits, to the device, the $n^{th}$ power control command in an $n^{th}$ subset of the downlink resources. In an aspect, n is greater than or equal to 2. For example, referring back to FIG. 5, the process of generating and transmitting a power control command by the base station 502, and transmitting a segment based on the power control command is repeated until the base station 502 receives all of the segments of the transmission block. For example, referring back to FIG. 5, at 526, the base station 502 generates a $(m-1)^{th}$ power control command (PCC m-1) based on the $(m-2)^{th}$ transmission from the device 504 and transmits the $(m-1)^{th}$ power control command to the device 504 (e.g., in subset (m-1) of the DL resources).

Figure 11:
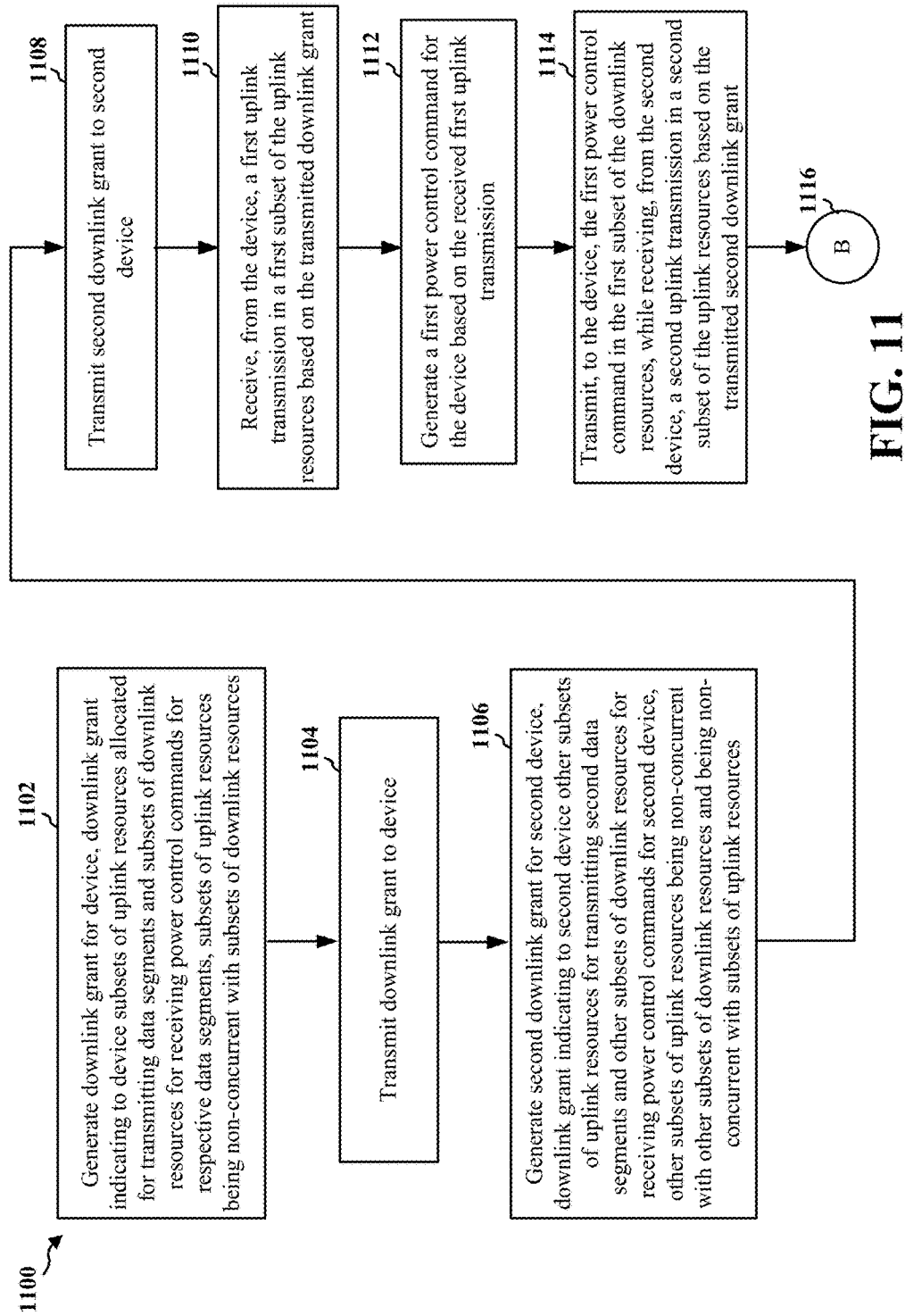
FIG. 11 is a flow chart of a method of wireless communication, according to an aspect of the disclosure.

FIG. 11 is a flow chart 1100 of a method of wireless communication, according to an aspect of the disclosure. The method may be performed by a base station (e.g., the base station 402, the apparatus 1302/1302'). At 1102, the base station generates a downlink grant for a device, the downlink grant indicating to the device subsets of uplink resources allocated for transmitting data segments and subsets of downlink resources for receiving power control commands for respective data segments, the subsets of uplink resources being non-concurrent with the subsets of downlink resources. For example, as discussed supra, the base station transmits to the device a grant that includes UL resources for multiple segments of a transmission block. In particular, for each segment of the transmission block, the grant specifies which portion of the UL resources should be used to transmit a corresponding segment. For example, referring back to FIG. 7, the grant 714 may be generated by the base station 702, and may include portions (subsets) of UL resources for UL transmissions of segments of the transmission block, and may include portions (subsets) of DL resources for DL transmissions of control commands. At 1104, the base station transmits the downlink grant to the device. In an aspect, the downlink grant includes a power control command for a first uplink transmission in a first subset of the uplink resources. For example, referring back to FIG. 7, in response to the random access request 712, the base station 702 transmits a grant 714 to the first device 704.

At 1106, the base station generates a second downlink grant for a second device, the downlink grant indicating to the second device other subsets of the uplink resources for transmitting second data segments and other subsets of downlink resources for receiving power control commands for the second device, the other subsets of the uplink resources being non-concurrent with the other subsets of the downlink resources and being non-concurrent with the subsets of the uplink resources. At 1108, the base station transmits the second downlink grant to the second device. For example, referring back to FIG. 7, in response to the random access request 752, the base station 702 transmits a grant at 754 to the second device 706, where the grant 754 may be generated by the base station 502. For example, as discussed supra, the grant may include portions (subsets) of UL resources for UL transmissions of segments of the transmission block, and may include portions (subsets) of DL resources for DL transmissions of control commands.

At 1110, the base station receives, from the device, a first uplink transmission in a first subset of the uplink resources based on the transmitted downlink grant. For example, referring back to FIG. 7, at 718, the first device 704 performs a first UL transmission by transmitting (e.g., in subset 1 of the UL resources) the first segment (Segment 1) of the transmission block to the base station 702, based on the transmit power level indicated in the initial power control command, where the grant may further include an initial power control command for the first segment of the transmission block.

At 1112, the bases station generates a first power control command for the device based on the received first uplink transmission. At 1114, the base station transmits, to the device, the first power control command in the first subset of the downlink resources, while receiving, from the second device, a second uplink transmission in a second subset of the uplink resources based on the transmitted second downlink grant. For example, referring back to FIG. 7, at 720, the base station 702 generates a first power control command (PCC 1) based on the first transmission and transmits the first power control command to the first device 704 (e.g., in subset 1 of the DL resources). For example, referring back to FIG. 7, the base station 702 transmits at 720 the first power control command (PCC 1) for the first device 704 on a subset of DL resources (e.g., subset 1 of the DL resources) while receiving at 758 the first segment (Segment 1') of the second transmission block from the second device 706 on a subset of UL resources (e.g., subset 1' of the UL resources). At 1116, one or more additional methods discussed infra may be performed.

Figures 12A, 12B:
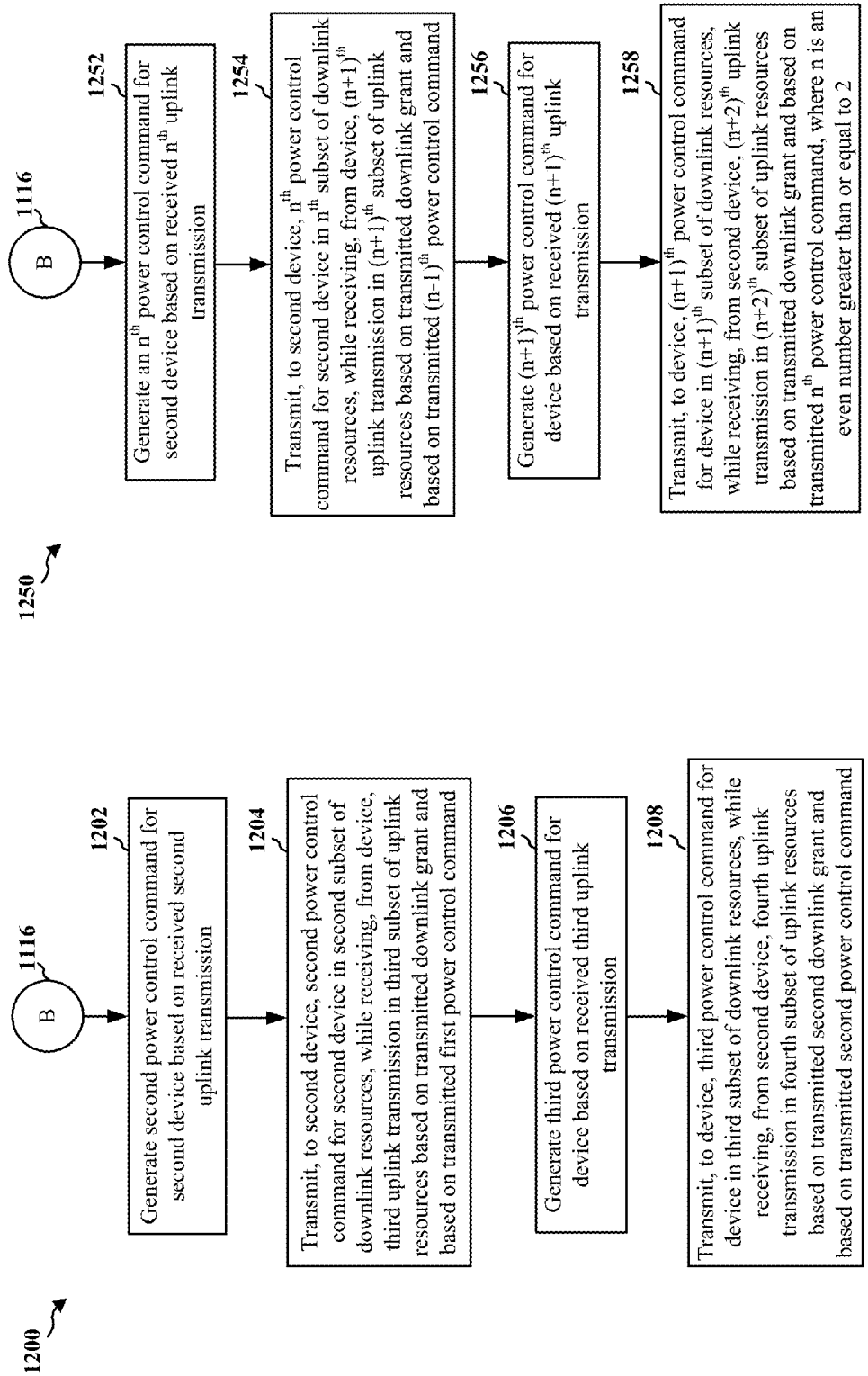
FIG. 12A is a flow chart of a method of wireless communication expanding from the flow chart of FIG. 11, according to an aspect of the disclosure.
FIG. 12B is a flow chart of a method of wireless communication expanding from the flow chart of FIG. 11, according to an aspect of the disclosure.

FIG. 12A is a flow chart 1200 of a method of wireless communication expanding from the flow chart 1100 of FIG. 11, according to an aspect of the disclosure. The method may be performed by a base station (e.g., the base station 402, the apparatus 1302/1302'). The flow chart 1200 expands from 1116 of FIG. 11.

At 1202, the base station generates a second power control command for the second device based on the received second uplink transmission. For example, referring back to FIG. 7, at 760, the base station 702 generates a first power control command (PCC 1') based on the first transmission and transmits the first power control command to the second device 706 (e.g., in subset 1' of the DL resources).

At 1204, the base station transmits, to the second device, the second power control command for the second device in a second subset of the downlink resources, while receiving, from the device, a third uplink transmission in a third subset of the uplink resources based on the transmitted downlink grant and based on the transmitted first power control command. For example, referring back to FIG. 7, the base station 702 transmits at 760 the first power control command (PCC 1') for the second device 706 on a subset of DL resources (e.g., in subset 1' of the DL resources) while receiving at 722 the second segment (Segment 2) of the first transmission block from the first device 704 on a subset of UL resources (e.g., in subset 2 of the UL resources).

At 1206, the base station generates a third power control command for the device based on the received third uplink transmission. For example, referring back to FIG. 7, at 724, the base station 702 generates a second power control command (PCC 2) based on the second transmission and transmits the second power control command to the first device 704 (e.g., in subset 2 of the DL resources). At 1208, the base station transmits, to the device, the third power control command for the device in a third subset of the downlink resources, while receiving, from the second device, a fourth uplink transmission in a fourth subset of the uplink resources based on the transmitted second downlink grant and based on the transmitted second power control command. For example, referring back to FIG. 7, the base station 702 transmits at 724 the second power control command (PCC 2) for the first device 704 on a subset of DL resources (e.g., in subset 2 of the DL resources) while receiving at 762 the second segment (Segment 2') of the second transmission block from the second device 706 on a subset of UL resources (e.g., in subset 2' of the UL resources).

FIG. 12B is a flow chart 1250 of a method of wireless communication expanding from the flow chart 1100 of FIG. 11, according to an aspect of the disclosure. The method may be performed by a base station (e.g., the base station 402, the apparatus 1302/1302'). The flow chart 1250 expands from 1116 of FIG. 11.

At 1252, the base station generates an $n^{th}$ power control command for the second device based on the received $n^{th}$ uplink transmission. At 1254, the base station transmits, to the second device, the $n^{th}$ power control command for the second device in a $n^{th}$ subset of the downlink resources, while receiving, from the device, a $(n+1)^{th}$ uplink transmission in a $(n+1)^{th}$ subset of the uplink resources based on the transmitted downlink grant and based on the transmitted $(n-1)^{th}$ power control command. At 1256, the base station generates a $(n+1)^{th}$ power control command for the device based on the received $(n+1)^{th}$ uplink transmission. At 1258, the base station transmits, to the device, the $(n+1)^{th}$ power control command for the device in a $(n+1)^{th}$ subset of the downlink resources, while receiving, from the second device, a $(n+2)^{th}$ uplink transmission in a $(n+2)^{th}$ subset of the uplink resources based on the transmitted downlink grant and based on the transmitted $n^{th}$ power control command. In an aspect, n is an even number greater than or equal to 2.

For example, referring back to FIG. 7, at 764, the second device 706 performs a $(p-1)^{th}$ UL transmission by transmitting (e.g., in subset (p-1)' of the UL resources) a $(p-1)^{th}$ segment (Segment (p-1)') of the second transmission block based on the transmit power level indicated in the $(p-2)^{th}$ power control command, to the base station 702. For example, referring back to FIG. 7, the base station 702 transmits at 726 the $(m-1)^{th}$ power control command (PCC m-1) for the first device on a subset of DL resources (e.g.,
in subset (m-1) of the UL resources) while receiving at 764 the $(p-1)^{th}$ segment (Segment (p-1)') of the second transmission block from the second device 706 on a subset of UL resources (e.g., in subset (p-1)' of the UL resources). For example, referring back to FIG. 7, the base station 702 transmits at 766 $(p-1)^{th}$ power control command (PCC (p-1)') for the second device 706 on a subset of DL resources (e.g., in subset (p-1)' of the DL resources) while receiving at 728 the $m^{th}$ segment (Segment m) of the first transmission block from the first device 704 on a subset of UL resources (e.g., in subset m of the UL resources).

Figure 13:
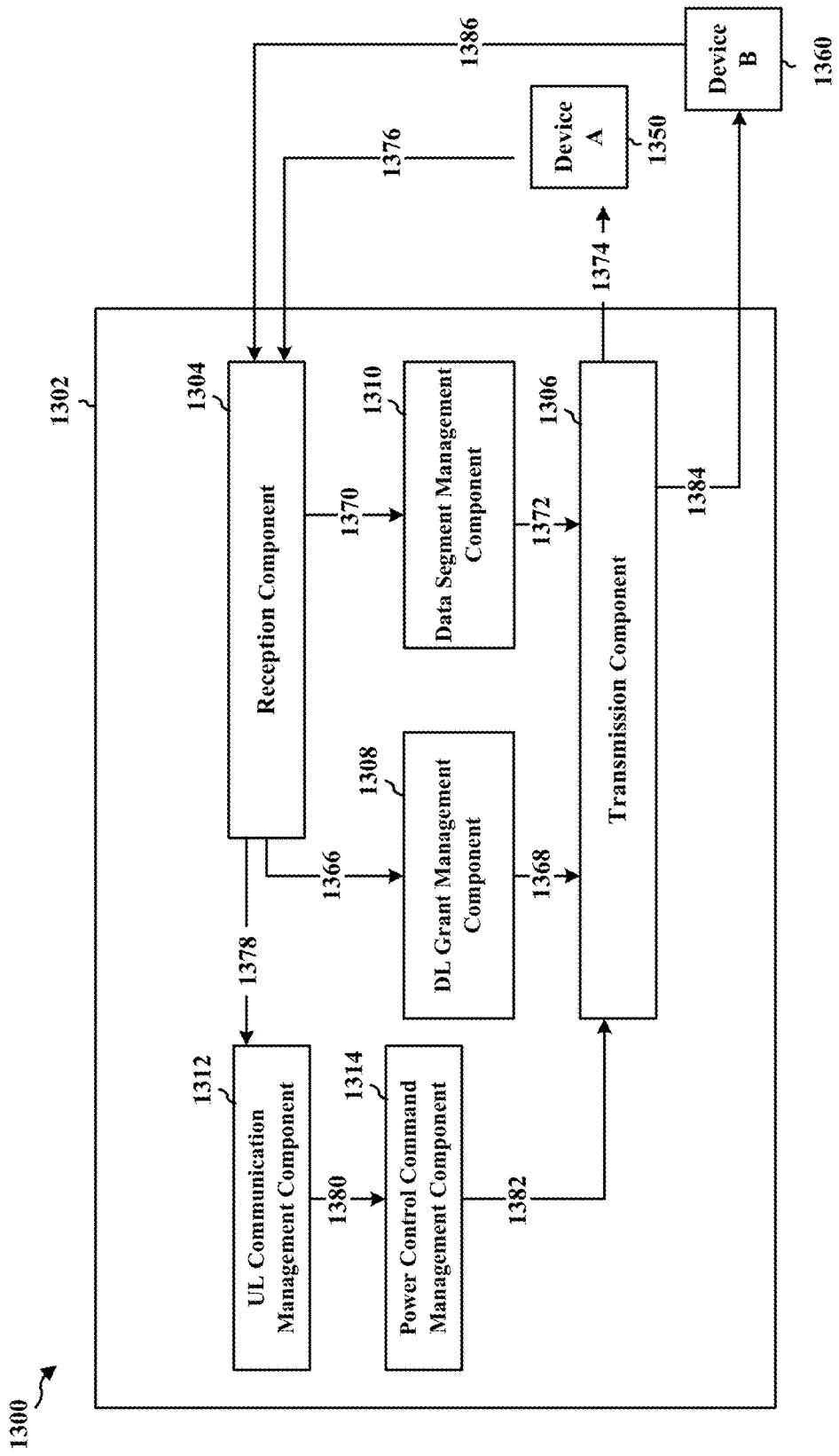
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a base station. The apparatus includes a reception component 1304, a transmission component 1306, a DL grant management component 1308, a data segment management component 1310, a UL communication management component 1312, and a power control command management component 1314.

The DL grant management component 1308 generates a downlink grant for a device (e.g., a first device (Device A) 1350), the downlink grant indicating to the first device 1350 subsets of uplink resources allocated for transmitting data segments and subsets of downlink resources for receiving power control commands for respective data segments, the subsets of uplink resources being non-concurrent with the subsets of downlink resources. The DL grant management component 1308 may also receive communication from the reception component 1304 at 1366. The data segment management component 1310 may determine a size for each of the data segments. The data segment management component 1310 may also receive communication from the reception component 1304 at 1370. The data segment management component 1310 may transmit via the transmission component 1306 the size for each of the data segments to the first device 1350, at 1372 and 1374. In an aspect, subsets of uplink resources are allocated for transmitting data segments based on size for each of data segments. In an aspect, the size of each of the data segments is determined based on at least one of data traffic, path loss to the first device 1350, a size of a transmission block, or a noise level. The DL grant management component 1308 transmits via the transmission component 1306 the downlink grant to the first device 1350, at 1368 and 1374. In an aspect, the downlink grant includes a power control command for a first uplink transmission in a first subset of the uplink resources.

According to an aspect, the UL communication management component 1312 receives via the reception component 1304, from the first device 1350, a first uplink transmission in a first subset of the uplink resources based on the transmitted downlink grant, at 1376 and 1378. The power control command management component 1314 generates a first power control command based on the received first uplink transmission at 1380. The power control command management component 1314 transmits via the transmission component 1306, to the first device 1350, the first power control command in a first subset of the downlink resources, at 1382 and 1374.

In such an aspect, the UL communication management component 1312 receives via the reception component 1304, from the first device 1350, a second uplink transmission in a second subset of the uplink resources based on the transmitted downlink grant and based on the transmitted first power control command, at 1376 and 1378. The power control command management component 1314 generates a second power control command based on the received second uplink transmission at 1380. The power control command management component 1314 transmits via the transmission component 1306, to the first device 1350, the second power control command in a second subset of the downlink resources, at 1382 and 1374.

In such an aspect, the UL communication management component 1312 receives via the reception component 1304, from the first device 1350, an $n^{th}$ uplink transmission in an $n^{th}$ subset of the uplink resources based on the transmitted downlink grant and based on transmitted $(n-1)^{th}$ power control command, at 1376 and 1378. The power control command management component 1314 generates an $n^{th}$ power control command based on the received $n^{th}$ uplink transmission at 1380. The power control command management component 1314 transmits via the transmission component 1306, to the first device 1350, the $n^{th}$ power control command in an $n^{th}$ subset of the downlink resources, at 1382 and 1374. In an aspect, n is greater than or equal to 2.

According to another aspect, the DL grant management component 1108 generates a second downlink grant for a second device (e.g., a second device (Device B) 1360), the downlink grant indicating to the second device 1360 other subsets of the uplink resources for transmitting second data segments and other subsets of downlink resources for receiving power control commands for the second device 1360, the other subsets of the uplink resources being non-concurrent with the other subsets of the downlink resources and being non-concurrent with the subsets of the uplink resources. The DL grant management component 1308 transmits via the transmission component 1306 the second downlink grant to the second device 1360, at 1368 and 1384. The UL communication management component 1312 receives via the reception component 1304, from the first device 1350, a first uplink transmission in a first subset of the uplink resources based on the transmitted downlink grant, at 1386 and 1378. The power control command management component 1314 generates a first power control command for the first device 1350 based on the received first uplink transmission at 1380. The power control command management component 1314 transmits via the transmission component 1306, to the first device 1350, the first power control command in the first subset of the downlink resources, at 1382 and 1374, while receiving via the reception component 1304 and the UL communication management component 1312, from the second device 1360, a second uplink transmission in a second subset of the uplink resources based on the transmitted second downlink grant, at 1386 and 1378.

In such an aspect, the power control command management component 1314 generates a second power control command for the second device 1360 based on the received second uplink transmission, at 1380. The power control command management component 1314 transmits via the transmission component 1306, to the second device 1360, the second power control command for the second device 1360 in a second subset of the downlink resources, at 1382 and 1384, while receiving via the reception component 1304 and the UL communication management component 1312, from the first device 1350, a third uplink transmission in a third subset of the uplink resources based on the transmitted downlink grant and based on the transmitted first power control command, at 1376 and 1378. The power control command management component 1314 generates a third power control command for the first device 1350 based on the received third uplink transmission, at 1380. The power control command management component 1314 transmits via the transmission component 1306, to the first device 1350, the third power control command for the first device 1350 in a third subset of the downlink resources, at 1382 and 1374, while receiving via the reception component 1304 and the UL communication management component 1312, from the second device 1360, a fourth uplink transmission in a fourth subset of the uplink resources based on the transmitted second downlink grant and based on the transmitted second power control command, at 1386 and 1378.

In such an aspect, the power control command management component 1314 generates an $n^{th}$ power control command for the second device 1360 based on the received $n^{th}$ uplink transmission at 1380. The power control command management component 1314 transmits via the transmission component 1306, to the second device 1360, the $n^{th}$ power control command for the second device 1360 in a $n^{th}$ subset of the downlink resources, at 1382 and 1384, while receiving via the reception component 1304 and the UL communication management component 1312, from the first device 1350, a $(n+1)^{th}$ uplink transmission in a $(n+1)^{th}$ subset of the uplink resources based on the transmitted downlink grant and based on the transmitted $(n-1)^{th}$ power control command, at 1376 and 1378. The power control command management component 1314 generates a $(n+1)^{th}$ power control command for the device first 1350 based on the received $(n+1)^{th}$ uplink transmission at 1380. The power control command management component 1314 transmits via the transmission component 1306, to the first device 1350, the $(n+1)^{th}$ power control command for the first device 1350 in a $(n+1)^{th}$ subset of the downlink resources, at 1382 and 1374, while receiving via the reception component 1304 and the UL communication management component 1312, from the second device 1360, a $(n+2)^{th}$ uplink transmission in a $(n+2)^{th}$ subset of the uplink resources based on the transmitted downlink grant and based on the transmitted $n^{th}$ power control command, at 1386 and 1378. In an aspect, n is an even number greater than or equal to 2.

The apparatus may include additional components that perform each of the blocks of the algorithm in the aforementioned flowcharts of FIGS. 9-12. As such, each block in the aforementioned flowcharts of FIGS. 9-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
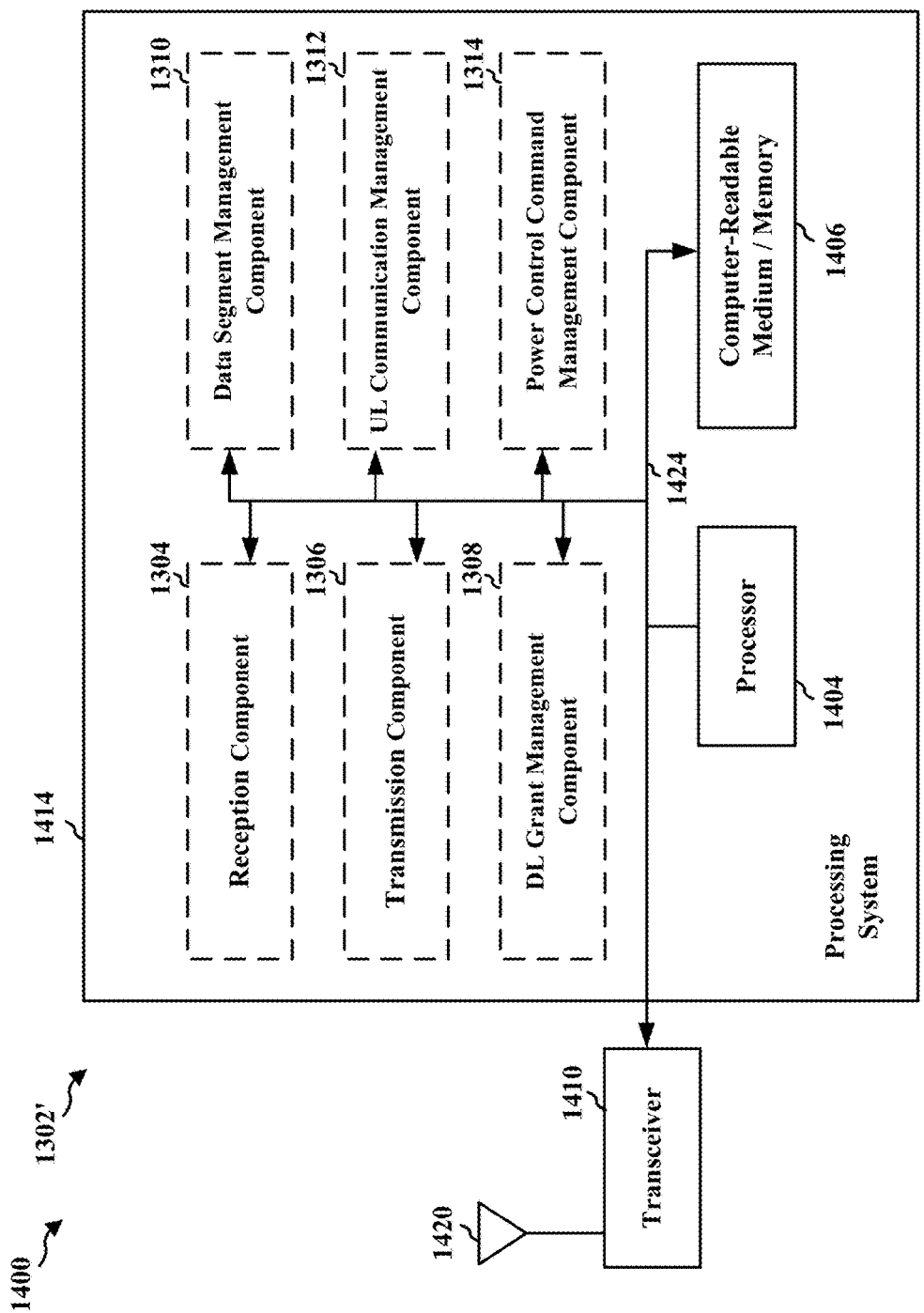
FIG. 14 is a diagram illustrating an example of a hardware implementation for an apparatus employing a processing system.

FIG. 14 is a diagram 1400 illustrating an example of a hardware implementation for an apparatus 1702' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1004, 1006, 1008, 1010, 1012, 1014, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1313, 1312, 1314. The components may be software components running in the processor 1404, resident/stored in the computer readable medium/memory 1406, one or more hardware components coupled to the processor 1404, or some combination thereof. The processing system 1414 may be a component of the eNB 310 and may include the memory 376 and/or at least one of the TX processor 316, the RX processor 370, and the controller/processor 375.

In one configuration, the apparatus 1302/1302' for wireless communication includes means for generating a downlink grant for a device (e.g., the first device 1350), the downlink grant indicating to the device subsets of uplink resources allocated for transmitting data segments and subsets of downlink resources for receiving power control commands for respective data segments, the subsets of uplink resources being non-concurrent with the subsets of downlink resources, means for transmitting the downlink grant to the device, means for receiving, from the device, a first uplink transmission in a first subset of the uplink resources based on the transmitted downlink grant, means for generating a first power control command based on the received first uplink transmission, and means for transmitting, to the device, the first power control command in a first subset of the downlink resources. The apparatus 1302/1302' may include means for receiving, from the device, a second uplink transmission in a second subset of the uplink resources based on the transmitted downlink grant and based on the transmitted first power control command, means for generating a second power control command based on the received second uplink transmission, and means for transmitting, to the device, the second power control command in a second subset of the downlink resources. The apparatus 1302/1302' may include means for receiving, from the device, an $n^{th}$ uplink transmission in an $n^{th}$ subset of the uplink resources based on the transmitted downlink grant and based on transmitted $(n-1)^{th}$ power control command, means for generating an $n^{th}$ power control command based on the received $n^{th}$ uplink transmission, means for transmitting, to the device, the $n^{th}$ power control command in an $n^{th}$ subset of the downlink resources, where n is greater than or equal to 2. The apparatus 1302/1302' may include means for determining a size for each of the data segments, wherein the subsets of the uplink resources are allocated for transmitting data segments based on the size for each of the data segments.

In another aspect, the apparatus 1302/1302' may include means for generating a second downlink grant for a second device (e.g., the second device 1360), the downlink grant indicating to the second device other subsets of the uplink resources for transmitting second data segments and other subsets of downlink resources for receiving power control commands for the second device, the other subsets of the uplink resources being non-concurrent with the other subsets of the downlink resources and being non-concurrent with the subsets of the uplink resources, means for transmitting the second downlink grant to the second device, means for receiving, from the device, a first uplink transmission in a first subset of the uplink resources based on the transmitted downlink grant, means for generating a first power control command for the device based on the received first uplink transmission, and means for transmitting, to the device, the first power control command in the first subset of the downlink resources, while receiving, from the second device, a second uplink transmission in a second subset of the uplink resources based on the transmitted second downlink grant.

In such an aspect, the apparatus 1302/1302' may include means for generating a second power control command for the second device based on the received second uplink transmission, means for transmitting, to the second device, the second power control command for the second device in a second subset of the downlink resources, while receiving, from the device, a third uplink transmission in a third subset of the uplink resources based on the received downlink grant and based on the received first power control command, means for generating a third power control command for the device based on the received third uplink transmission, and means for transmitting, to the device, the third power control command for the device in a third subset of the downlink resources, while receiving, from the second device, a fourth uplink transmission in a fourth subset of the uplink resources based on the received second downlink grant and based on the received second power control command. The apparatus 1302/1302' may include means for generating an $n^{th}$ power control command for the second device based on the received $n^{th}$ uplink transmission, means for transmitting, to the second device, the $n^{th}$ power control command for the second device in a $n^{th}$ subset of the downlink resources, while receiving, from the device, a $(n+1)^{th}$ uplink transmission in a $(n+1)^{th}$ subset of the uplink resources based on the received downlink grant and based on the received $(n-1)^{th}$ power control command, means for generating a $(n+1)^{th}$ power control command for the device based on the received $(n+1)^{th}$ uplink transmission, and means for transmitting, to the device, the $(n+1)^{th}$ power control command for the device in a $(n+1)^{th}$ subset of the downlink resources, while receiving, from the second device, a $(n+2)^{th}$ uplink transmission in a $(n+2)^{th}$ subset of the uplink resources based on the received downlink grant and based on the received $n^{th}$ power control command, where n is an even number greater than or equal to 2.

The aforementioned means may be one or more of the aforementioned components of the apparatus 1702 and/or the processing system 1414 of the apparatus 1702' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
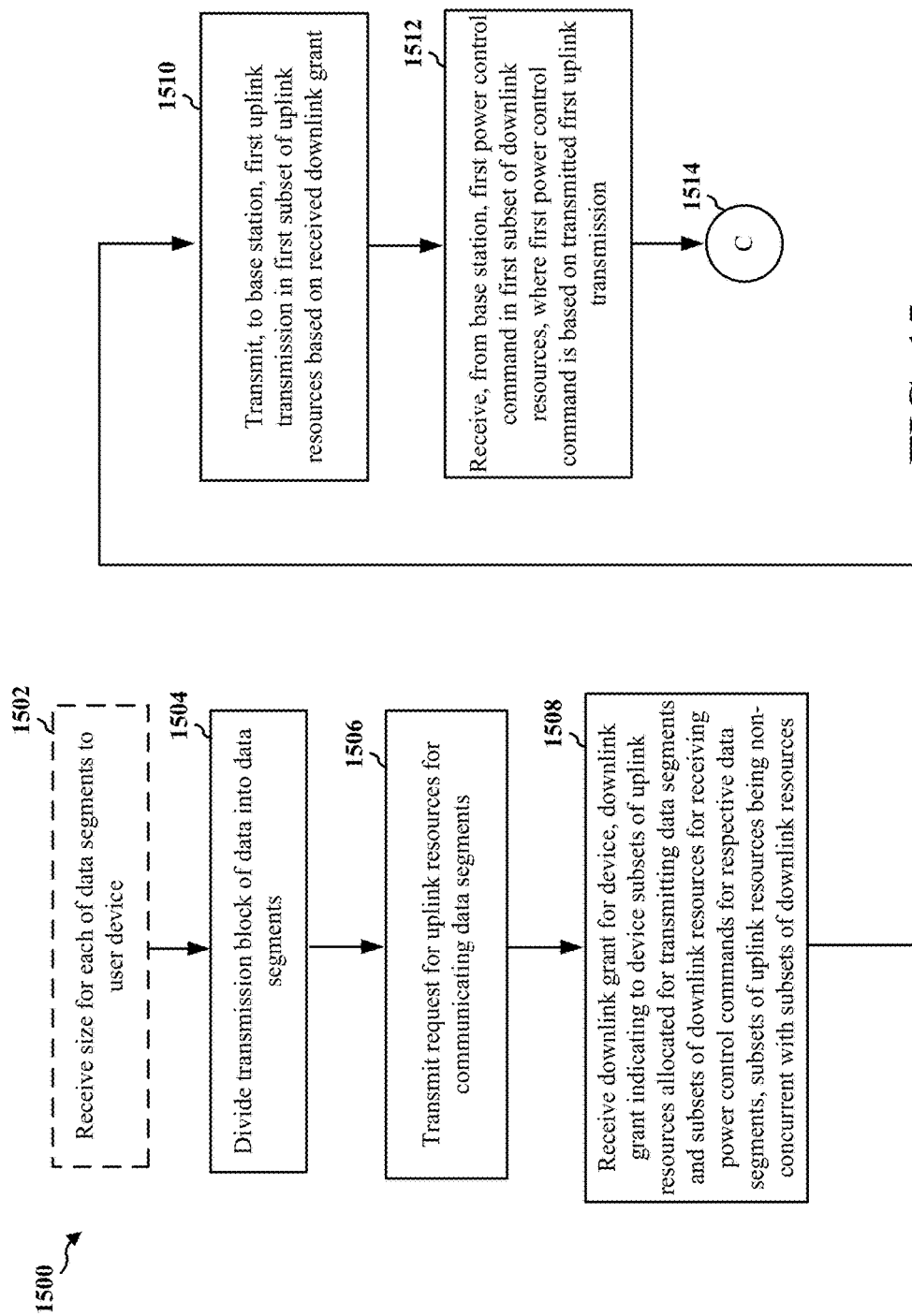
FIG. 15 is a flow chart of a method of wireless communication, according to an aspect of the disclosure.

FIG. 15 is a flow chart 1500 of a method of wireless communication, according to an aspect of the disclosure. The method may be performed by a device (e.g., the device 504, the apparatus 1702/1702'). At 1502, the device receives the size for each of the data segments to the device. For example, as discussed supra, the base station may determine the size of each segment, and transmit size information including sizes of the segments to the device.

At 1504, the device divides a transmission block of data into data segments. In an aspect, the transmission block of data is divided into the data segments based on the size for each of the data segments. For example, as discussed supra, when the device divides the transmission block into multiple segments, the device may divide the transmission block based on sizes of the segments specified by the base station. In an aspect, the size of each of the data segments is determined based on at least one of data traffic, path loss to the device, a size of a transmission block, or a noise level. For example, as discussed supra, the base station may determine the size of each segment based on one or more factors including traffic of the system, a path loss, SNR, the message size the device wants to transmit.

At 1506, the device transmits a request for uplink resources for communicating the data segments. For example, referring back to FIG. 5, the device 504 transmits a random access request 512 indicating that the device 504 requests UL resources to perform UL transmission. At 1508, the device receives a downlink grant for the device, the downlink grant indicating to the device subsets of uplink resources allocated for transmitting the data segments and subsets of downlink resources for receiving power control commands for respective data segments, the subsets of uplink resources being non-concurrent with the subsets of downlink resources. For example, referring back to FIG. 5, in response to the random access request 512, the base station 502 transmits a grant 514 to the device 504. For example, as discussed supra, the grant may include portions (subsets) of UL resources for UL transmissions of segments of the transmission block, and may include portions (subsets) of DL resources for DL transmissions of control commands. In an aspect, the downlink grant includes a power control command for a first uplink transmission in a first subset of the uplink resources. For example, as discussed supra, the grant may further include an initial power control command for the first segment of the transmission block.

At 1510, the device transmits, to a base station, a first uplink transmission in a first subset of the uplink resources based on the received downlink grant. For example, referring back to FIG. 5, the device 504 performs a first UL transmission by transmitting (e.g., in subset 1 of the UL resources) the first segment (Segment 1) of the transmission block to the base station 502, based on the transmit power level indicated in the initial power control command. At 1512, the device receives, from the base station, the first power control command in a first subset of the downlink resources. In an aspect, the first power control command is based on the transmitted first uplink transmission. For example, referring back to FIG. 5, at 520, the base station 502 generates a first power control command (PCC 1) based on the first transmission and transmits the first power control command to the device 504 (e.g., in subset 1 of the DL resources). At 1514, one or more additional methods discussed infra may be performed.

Figures 16A, 16B:
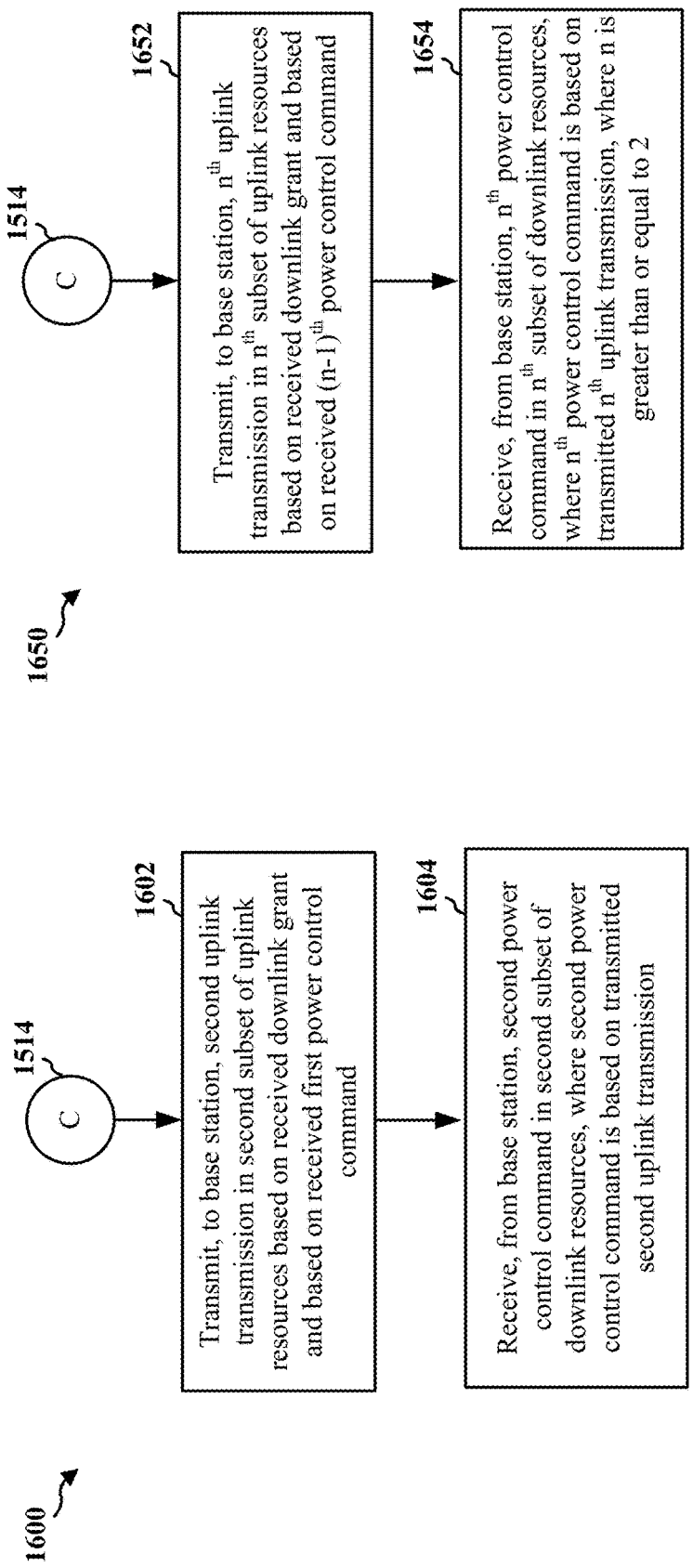
FIG. 16A is a flow chart of a method of wireless communication expanding from the flow chart of FIG. 15, according to an aspect of the disclosure.
FIG. 16B is a flow chart of a method of wireless communication expanding from the flow chart of FIG. 15, according to an aspect of the disclosure.

FIG. 16A is a flow chart 1600 of a method of wireless communication expanding from the flow chart 1500 of FIG. 15, according to an aspect of the disclosure. The method may be performed by a device (e.g., the device 504, the apparatus 1702/1702'). The flow chart 1600 expands from 1514 of FIG. 15.

At 1602, the device transmits, to the base station, a second uplink transmission in a second subset of the uplink resources based on the received downlink grant and based on the received first power control command. For example, referring back to FIG. 5, at 522, the device 504 performs a second UL transmission by transmitting (e.g., in subset 2 of the UL resources) a second segment (Segment 2) of the transmission block based on the transmit power level indicated in the first power control command, to the base station 502. At 1604, the device receives, from the base station, the second power control command in a second subset of the downlink resources, wherein the second power control command is based on the transmitted second uplink transmission. For example, referring back to FIG. 5, at 524, the base station 502 generates a second power control command (PCC 2) based on the second transmission and transmits the second power control command to the device 504 (e.g., in subset 2 of the DL resources).

FIG. 16B is a flow chart 1650 of a method of wireless communication expanding from the flow chart 1500 of FIG. 15, according to an aspect of the disclosure. The method may be performed by a device (e.g., the device 504, the apparatus 1702/1702'). The flow chart 1650 expands from 1514 of FIG. 15.

At 1652, the device transmits, to the base station, an $n^{th}$ uplink transmission in an $n^{th}$ subset of the uplink resources based on the received downlink grant and based on the received $(n-1)^{th}$ power control command. At 1654, the device receives, from the base station, the $n^{th}$ power control command in an $n^{th}$ subset of the downlink resources, wherein the $n^{th}$ power control command is based on the transmitted $n^{th}$ uplink transmission. In aspect, n is greater than or equal to 2. For example, as discussed supra, the process of generating and transmitting a power control command by the base station 502, and transmitting a segment based on the power control command is repeated until the base station 502 receives all of the segments of the transmission block. For example, referring back to FIG. 5, after receiving (m−2) segments from the device 504, at 526, the base station 502 generates a $(m-1)^{th}$ power control command (PCC m−1) based on the $(m-2)^{th}$ transmission from the device 504 and transmits the $(m-1)^{th}$ power control command to the device 504 (e.g., in subset (m−1) of the DL resources).

Figure 17:
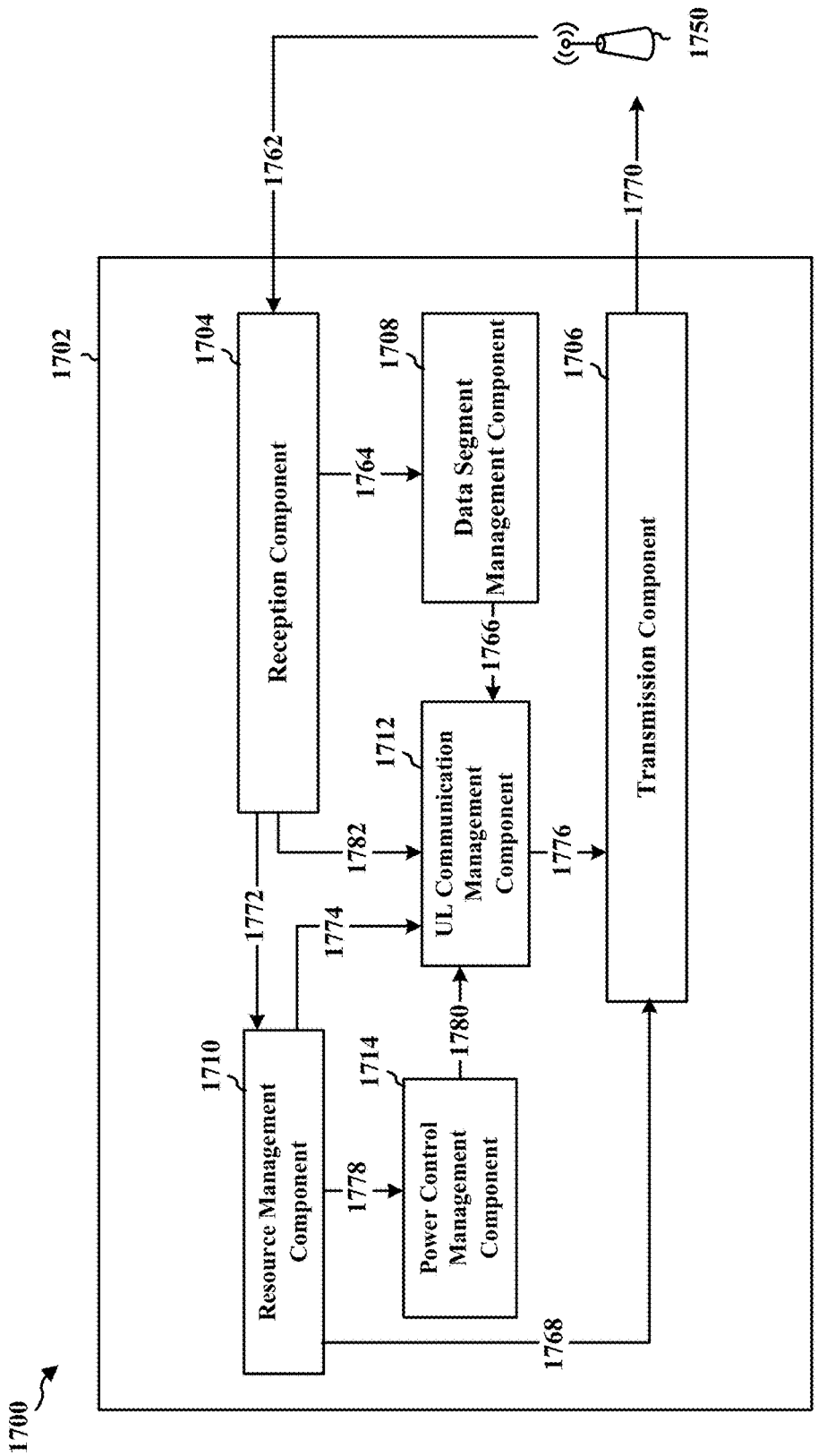
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a device. The apparatus includes a reception component 1704, a transmission component 1706, a data segment management component 1708, a resource management component 1710, a UL communication management component 1712, and a power control management component 1714.

The data segment management component 1708 receives via the reception component 1704 the size for each of the data segments to the device, at 1762 and 1764. The data segment management component 1708 may forward the size for each of the data segments to the UL communication management component 1712, at 1766. The data segment management component 1708 divides a transmission block of data into data segments. In an aspect, the transmission block of data is divided into the data segments based on the size for each of the data segments. In an aspect, the size of each of the data segments is determined based on at least one of data traffic, path loss to the device, a size of a transmission block, or a noise level. The resource management component 1710 transmits via the transmission component 1706 a request for uplink resources for communicating the data segments, at 1768 and 1770. The resource management component 1710 receives via the reception component 1704 a downlink grant for the device (e.g., apparatus 1702), the downlink grant indicating to the device subsets of uplink resources allocated for transmitting the data segments and subsets of downlink resources for receiving power control commands for respective data segments, the subsets of uplink resources being non-concurrent with the subsets of downlink resources, at 1762 and 1772. The resource management component 1710 may forward the downlink grant to the UL communication management component 1712, at 1774. In an aspect, the downlink grant includes a power control command for a first uplink transmission in a first subset of the uplink resources.

The UL communication management component 1712 transmits via the transmission component 1706, to a base station 1750, a first uplink transmission in a first subset of the uplink resources based on the received downlink grant, at 1776 and 1770. The power control management component 1714 receives via the reception component 1704 and the resource management component 1710, from the base station 1750, the first power control command in a first subset of the downlink resources, where the first power control command is based on the transmitted first uplink transmission, at 1762, 1772, and 1778. The power control management component 1714 may forward information about first power control command to the UL communication management component 1712, at 1780. The UL communication management component 1712 may also receive communication from the reception component 1704 at 1782.

According to an aspect, the UL communication management component 1712 transmits via the transmission component 1706, to the base station 1750, a second uplink transmission in a second subset of the uplink resources based on the received downlink grant and based on the received first power control command, at 1776 and 1770. The power control management component 1714 receives via the reception component 1704 and the resource management component 1710, from the base station 1750, the second power control command in a second subset of the downlink resources, at 1762, 1772, and 1778, where the second power control command is based on the transmitted second uplink transmission.

According to an aspect, the UL communication management component 1712 transmits via the transmission component 1706, to the base station 1750, an $n^{th}$ uplink transmission in an $n^{th}$ subset of the uplink resources based on the received downlink grant and based on the received $(n-1)^{th}$ power control command, at 1776 and 1770. The power control management component 1714 receives via the reception component 1704 and the resource management component 1710, from the base station 1750, the $n^{th}$ power control command in an $n^{th}$ subset of the downlink resources, at 1762, 1772, and 1778, where the $n^{th}$ power control command is based on the transmitted $n^{th}$ uplink transmission. In aspect, n is greater than or equal to 2.

The apparatus may include additional components that perform each of the blocks of the algorithm in the aforementioned flowcharts of FIGS. 15 and 16. As such, each block in the aforementioned flowcharts of FIGS. 15 and 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
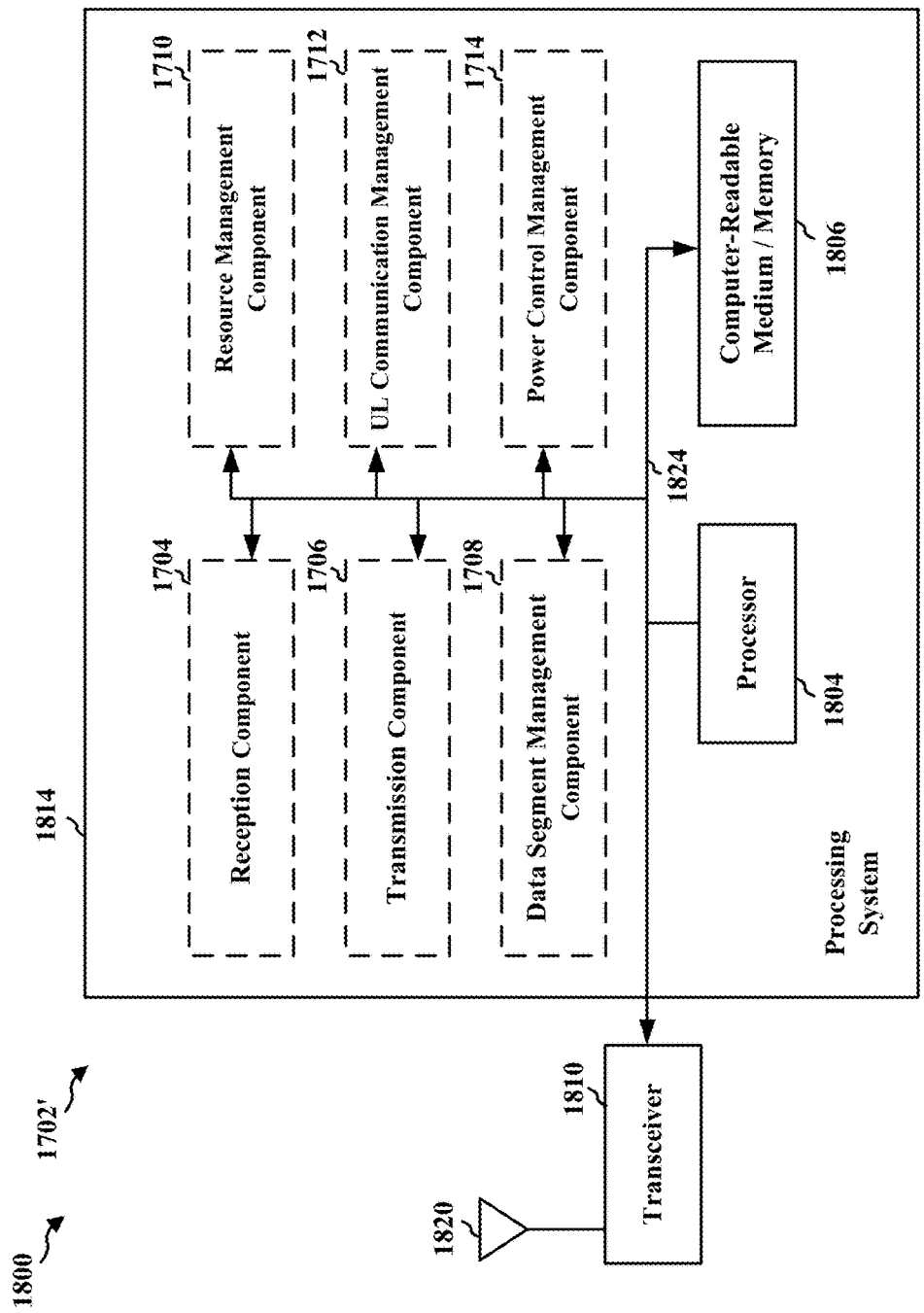
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, 1714, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712, 1714. The components may be software components running in the processor 1804, resident/stored in the computer readable medium/memory 1806, one or more hardware components coupled to the processor 1804, or some combination thereof. The processing system 1814' may be a component of the UE 350 and may include the memory 360 and/or at least one of the TX processor 368, the RX processor 356, and the controller/processor 359.

In one configuration, the apparatus 1702/1702' for wireless communication includes means for dividing a transmission block of data into data segments, means for transmitting a request for uplink resources for communicating the data segments, and means for receiving a downlink grant for the device (e.g., apparatus 1702/1702'), the downlink grant indicating to the device subsets of uplink resources allocated for transmitting the data segments and subsets of downlink resources for receiving power control commands for respective data segments, the subsets of uplink resources being non-concurrent with the subsets of downlink resources, means for transmitting, to a base station, a first uplink transmission in a first subset of the uplink resources based on the received downlink grant, and means for receiving, from the base station, the first power control command in a first subset of the downlink resources, where the first power control command is based on the transmitted first uplink transmission. The apparatus 1702/1702' may include means for transmitting, to the base station, a second uplink transmission in a second subset of the uplink resources based on the received downlink grant and based on the received first power control command, and means for receiving, from the base station, the second power control command in a second subset of the downlink resources, where the second power control command is based on the transmitted second uplink transmission. The apparatus 1702/1702' may include means for transmitting, to the base station, a $n^{th}$ uplink transmission in a $n^{th}$ subset of the uplink resources based on the received downlink grant and based on received $(n-1)^{th}$ power control command, and means for receiving, from the base station, the $n^{th}$ power control command in a $n^{th}$ subset of the downlink resources, where the $n^{th}$ power control command is based on the transmitted $n^{th}$ uplink transmission, where n is greater than or equal to 2. The apparatus 1702/1702' may include means for receiving the size for each of the data segments to the device, where the transmission block of data is divided into the data segments based on the size for each of the data segments.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
   generating a downlink grant for a device, the downlink grant indicating to the device subsets of uplink resources allocated for transmitting data segments and subsets of downlink resources for receiving power control commands for respective data segments, the subsets of the uplink resources being non-concurrent with the subsets of the downlink resources; and
   transmitting the downlink grant to the device.

2. The method of claim 1, further comprising:
   receiving, from the device, a first uplink transmission in a first subset of the uplink resources based on the transmitted downlink grant;
   generating a first power control command based on the received first uplink transmission; and
   transmitting, to the device, the first power control command in a first subset of the downlink resources.

3. The method of claim 2, further comprising:
   receiving, from the device, a second uplink transmission in a second subset of the uplink resources based on the transmitted downlink grant and based on the transmitted first power control command;
   generating a second power control command based on the received second uplink transmission; and
   transmitting, to the device, the second power control command in a second subset of the downlink resources.

4. The method of claim 2, further comprising:
   receiving, from the device, an $n^{th}$ uplink transmission in an $n^{th}$ subset of the uplink resources based on the transmitted downlink grant and based on transmitted $(n-1)^{th}$ power control command;
   generating an $n^{th}$ power control command based on the received $n^{th}$ uplink transmission; and
   transmitting, to the device, the $n^{th}$ power control command in an $n^{th}$ subset of the downlink resources,
   wherein n is greater than or equal to 2.

5. The method of claim 1, wherein the downlink grant includes a power control command for a first uplink transmission in a first subset of the uplink resources.

6. The method of claim 1, further comprising:
   determining a size for each of the data segments, wherein the subsets of the uplink resources are allocated for transmitting data segments based on the size for each of the data segments.

7. The method of claim 6, wherein the size of each of the data segments is determined based on at least one of data traffic, path loss to the device, a size of a transmission block, or a noise level.

8. The method of claim 1, further comprising:
   generating a second downlink grant for a second device, the downlink grant indicating to the second device other subsets of the uplink resources for transmitting second data segments and other subsets of the downlink resources for receiving power control commands for the second device, the other subsets of the uplink resources being non-concurrent with the other subsets of the downlink resources and being non-concurrent with the subsets of the uplink resources; and transmitting the second downlink grant to the second device.

9. The method of claim 8, further comprising:

receiving, from the device, a first uplink transmission in a first subset of the uplink resources based on the transmitted downlink grant;

generating a first power control command for the device based on the received first uplink transmission; and transmitting, to the device, the first power control command in the first subset of the downlink resources, while receiving, from the second device, a second uplink transmission in a second subset of the uplink resources based on the transmitted second downlink grant.

10. The method of claim 9, further comprising:

generating a second power control command for the second device based on the received second uplink transmission; and transmitting, to the second device, the second power control command for the second device in a second subset of the downlink resources, while receiving, from the device, a third uplink transmission in a third subset of the uplink resources based on the transmitted downlink grant and based on the transmitted first power control command.

11. The method of claim 10, further comprising:

generating a third power control command for the device based on the received third uplink transmission; and transmitting, to the device, the third power control command for the device in a third subset of the downlink resources, while receiving, from the second device, a fourth uplink transmission in a fourth subset of the uplink resources based on the transmitted second downlink grant and based on the transmitted second power control command.

12. The method of claim 9, further comprising:

generating an $n^{th}$ power control command for the second device based on the received $n^{th}$ uplink transmission; and transmitting, to the second device, the $n^{th}$ power control command for the second device in a $n^{th}$ subset of the downlink resources, while receiving, from the device, a $(n+1)^{th}$ uplink transmission in a $(n+1)^{th}$ subset of the uplink resources based on the transmitted downlink grant and based on transmitted $(n-1)^{th}$ power control command;

generating a $(n+1)^{th}$ power control command for the device based on the received $(n+1)^{th}$ uplink transmission; and transmitting, to the device, the $(n+1)^{th}$ power control command for the device in a $(n+1)^{th}$ subset of the downlink resources, while receiving, from the second device, a $(n+2)^{th}$ uplink transmission in a $(n+2)^{th}$ subset of the uplink resources based on the transmitted downlink grant and based on the transmitted $n^{th}$ power control command, wherein n is an even number greater than or equal to 2.

13. A method of wireless communication of a device, comprising:

dividing a transmission block of data into data segments;

transmitting a request for uplink resources for communicating the data segments; and receiving a downlink grant for the device, the downlink grant indicating to the device subsets of uplink resources allocated for transmitting the data segments and subsets of downlink resources for receiving power control commands for respective data segments, the subsets of the uplink resources being non-concurrent with the subsets of the downlink resources.

14. The method of claim 13, further comprising:

transmitting, to a base station, a first uplink transmission in a first subset of the uplink resources based on the received downlink grant; and receiving, from the base station, a first power control command in a first subset of the downlink resources, wherein the first power control command is based on the transmitted first uplink transmission.

15. The method of claim 14, further comprising:

transmitting, to the base station, a second uplink transmission in a second subset of the uplink resources based on the received downlink grant and based on the received first power control command; and receiving, from the base station, a second power control command in a second subset of the downlink resources, wherein the second power control command is based on the transmitted second uplink transmission.

16. The method of claim 14, further comprising:

transmitting, to the base station, a $n^{th}$ uplink transmission in a $n^{th}$ subset of the uplink resources based on the received downlink grant and based on received $(n-1)^{th}$ power control command; and receiving, from the base station, the $n^{th}$ power control command in a $n^{th}$ subset of the downlink resources, wherein the $n^{th}$ power control command is based on the transmitted $n^{th}$ uplink transmission, wherein n is greater than or equal to 2.

17. The method of claim 13, wherein the downlink grant includes a power control command for a first uplink transmission in a first subset of the uplink resources.

18. The method of claim 13, further comprising:

receiving the size for each of the data segments to the device, wherein the transmission block of data is divided into the data segments based on the size for each of the data segments.

19. The method of claim 18, wherein the size of each of the data segments is determined based on at least one of data traffic, path loss to the device, a size of a transmission block, or a noise level.

20. A base station for wireless communication, comprising:

means for generating a downlink grant for a device, the downlink grant indicating to the device subsets of uplink resources allocated for transmitting data segments and subsets of downlink resources for receiving power control commands for respective data segments, the subsets of the uplink resources being non-concurrent with the subsets of the downlink resources; and means for transmitting the downlink grant to the device.

21. The base station of claim 20, further comprising:

means for receiving, from the device, a first uplink transmission in a first subset of the uplink resources based on the transmitted downlink grant;

means for generating a first power control command based on the received first uplink transmission; and means for transmitting, to the device, the first power control command in a first subset of the downlink resources.

22. The base station of claim 21, further comprising:
means for receiving, from the device, a second uplink transmission in a second subset of the uplink resources based on the transmitted downlink grant and based on the transmitted first power control command;
means for generating a second power control command based on the received second uplink transmission; and
means for transmitting, to the device, the second power control command in a second subset of the downlink resources.

23. The base station of claim 21, further comprising:
means for receiving, from the device, an $n^{th}$ uplink transmission in an $n^{th}$ subset of the uplink resources based on the transmitted downlink grant and based on transmitted $(n-1)^{th}$ power control command;
means for generating an $n^{th}$ power control command based on the received $n^{th}$ uplink transmission; and
means for transmitting, to the device, the $n^{th}$ power control command in an $n^{th}$ subset of the downlink resources,
wherein n is greater than or equal to 2.

24. The base station of claim 20, wherein the downlink grant includes a power control command for a first uplink transmission in a first subset of the uplink resources.

25. The base station of claim 20, further comprising:
means for determining a size for each of the data segments, wherein the subsets of the uplink resources are allocated for transmitting data segments based on the size for each of the data segments.

26. The base station of claim 25, wherein the size of each of the data segments is determined based on at least one of data traffic, path loss to the device, a size of a transmission block, or a noise level.

27. The base station of claim 20, further comprising:
means for generating a second downlink grant for a second device, the downlink grant indicating to the second device other subsets of the uplink resources for transmitting second data segments and other subsets of the downlink resources for receiving power control commands for the second device, the other subsets of the uplink resources being non-concurrent with the other subsets of the downlink resources and being non-concurrent with the subsets of the uplink resources; and
means for transmitting the second downlink grant to the second device.

28. The base station of claim 27, further comprising:
means for receiving, from the device, a first uplink transmission in a first subset of the uplink resources based on the transmitted downlink grant;
means for generating a first power control command for the device based on the received first uplink transmission; and
means for transmitting, to the device, the first power control command in the first subset of the downlink resources, while receiving, from the second device, a second uplink transmission in a second subset of the uplink resources based on the transmitted second downlink grant.

29. The base station of claim 28, further comprising:
means for generating a second power control command for the second device based on the received second uplink transmission; and
means for transmitting, to the second device, the second power control command for the second device in a second subset of the downlink resources, while receiving, from the device, a third uplink transmission in a third subset of the uplink resources based on the transmitted downlink grant and based on the transmitted first power control command.

30. The base station of claim 29, further comprising:
means for generating a third power control command for the device based on the received third uplink transmission; and
means for transmitting, to the device, the third power control command for the device in a third subset of the downlink resources, while receiving, from the second device, a fourth uplink transmission in a fourth subset of the uplink resources based on the transmitted second downlink grant and based on the transmitted second power control command.

31. The base station of claim 28, further comprising:
means for generating an $n^{th}$ power control command for the second device based on the received $n^{th}$ uplink transmission; and
means for transmitting, to the second device, the $n^{th}$ power control command for the second device in a $n^{th}$ subset of the downlink resources, while receiving, from the device, a $(n+1)^{th}$ uplink transmission in a $(n+1)^{th}$ subset of the uplink resources based on the transmitted downlink grant and based on transmitted $(n-1)^{th}$ power control command;
means for generating a $(n+1)^{th}$ power control command for the device based on the received $(n+1)^{th}$ uplink transmission; and
means for transmitting, to the device, the $(n+1)^{th}$ power control command for the device in a $(n+1)^{th}$ subset of the downlink resources, while receiving, from the second device, a $(n+2)^{th}$ uplink transmission in a $(n+2)^{th}$ subset of the uplink resources based on the transmitted downlink grant and based on the transmitted $n^{th}$ power control command,
wherein n is an even number greater than or equal to 2.

32. A device for wireless communication, comprising:
means for dividing a transmission block of data into data segments;
means for transmitting a request for uplink resources for communicating the data segments; and
means for receiving a downlink grant for the device, the downlink grant indicating to the device subsets of uplink resources allocated for transmitting the data segments and subsets of downlink resources for receiving power control commands for respective data segments, the subsets of the uplink resources being non-concurrent with the subsets of the downlink resources.

33. The device of claim 32, further comprising:
means for transmitting, to a base station, a first uplink transmission in a first subset of the uplink resources based on the received downlink grant; and
means for receiving, from the base station, a first power control command in a first subset of the downlink resources, wherein the first power control command is based on the transmitted first uplink transmission.

34. The device of claim 33, further comprising:
means for transmitting, to the base station, a second uplink transmission in a second subset of the uplink resources based on the received downlink grant and based on the received first power control command; and
means for receiving, from the base station, a second power control command in a second subset of the downlink resources, wherein the second power control command is based on the transmitted second uplink transmission.

35. The device of claim 33, further comprising:
means for transmitting, to the base station, a $n^{th}$ uplink transmission in a $n^{th}$ subset of the uplink resources based on the received downlink grant and based on received $(n-1)^{th}$ power control command; and
means for receiving, from the base station, the $n^{th}$ power control command in a $n^{th}$ subset of the downlink resources, wherein the $n^{th}$ power control command is based on the transmitted $n^{th}$ uplink transmission,
wherein n is greater than or equal to 2.

36. The device of claim 32, wherein the downlink grant includes a power control command for a first uplink transmission in a first subset of the uplink resources.

37. The device of claim 32, further comprising:
means for receiving the size for each of the data segments to the device, wherein the transmission block of data is divided into the data segments based on the size for each of the data segments.

38. The device of claim 37, wherein the size of each of the data segments is determined based on at least one of data traffic, path loss to the device, a size of a transmission block, or a noise level.

39. A base station for wireless communication, comprising:
a memory; and
at least one processor coupled to the memory and configured to:
generate a downlink grant for a device, the downlink grant indicating to the device subsets of uplink resources allocated for transmitting data segments and subsets of downlink resources for receiving power control commands for respective data segments, the subsets of the uplink resources being non-concurrent with the subsets of the downlink resources; and
transmit the downlink grant to the device.

40. The base station of claim 39, wherein the at least one processor is further configured to:
receive, from the device, a first uplink transmission in a first subset of the uplink resources based on the transmitted downlink grant;
generate a first power control command based on the received first uplink transmission; and
transmit, to the device, the first power control command in a first subset of the downlink resources.

41. The base station of claim 40, wherein the at least one processor is further configured to:
receive, from the device, a second uplink transmission in a second subset of the uplink resources based on the transmitted downlink grant and based on the transmitted first power control command;
generate a second power control command based on the received second uplink transmission; and
transmit, to the device, the second power control command in a second subset of the downlink resources.

42. The base station of claim 40, wherein the at least one processor is further configured to:
receive, from the device, an $n^{th}$ uplink transmission in an $n^{th}$ subset of the uplink resources based on the transmitted downlink grant and based on transmitted $(n-1)^{th}$ power control command;
generate an $n^{th}$ power control command based on the received $n^{th}$ uplink transmission; and
transmit, to the device, the $n^{th}$ power control command in an $n^{th}$ subset of the downlink resources,
wherein n is greater than or equal to 2.

43. The base station of claim 39, wherein the downlink grant includes a power control command for a first uplink transmission in a first subset of the uplink resources.

44. The base station of claim 39, wherein the at least one processor is further configured to:
determine a size for each of the data segments, wherein the subsets of the uplink resources are allocated for transmitting data segments based on the size for each of the data segments.

45. The base station of claim 44, wherein the size of each of the data segments is determined based on at least one of data traffic, path loss to the device, a size of a transmission block, or a noise level.

46. The base station of claim 39, wherein the at least one processor is further configured to:
generate a second downlink grant for a second device, the downlink grant indicating to the second device other subsets of the uplink resources for transmitting second data segments and other subsets of the downlink resources for receiving power control commands for the second device, the other subsets of the uplink resources being non-concurrent with the other subsets of the downlink resources and being non-concurrent with the subsets of the uplink resources; and
transmit the second downlink grant to the second device.

47. The base station of claim 46, wherein the at least one processor is further configured to:
receive, from the device, a first uplink transmission in a first subset of the uplink resources based on the transmitted downlink grant;
generate a first power control command for the device based on the received first uplink transmission; and
transmit, to the device, the first power control command in the first subset of the downlink resources, while receiving, from the second device, a second uplink transmission in a second subset of the uplink resources based on the transmitted second downlink grant.

48. The base station of claim 47, wherein the at least one processor is further configured to:
generate a second power control command for the second device based on the received second uplink transmission; and
transmit, to the second device, the second power control command for the second device in a second subset of the downlink resources, while receiving, from the device, a third uplink transmission in a third subset of the uplink resources based on the transmitted downlink grant and based on the transmitted first power control command.

49. The base station of claim 48, wherein the at least one processor is further configured to:
generate a third power control command for the device based on the received third uplink transmission; and
transmit, to the device, the third power control command for the device in a third subset of the downlink resources, while receiving, from the second device, a fourth uplink transmission in a fourth subset of the uplink resources based on the transmitted second downlink grant and based on the transmitted second power control command.

50. The base station of claim 47, wherein the at least one processor is further configured to:
generate an $n^{th}$ power control command for the second device based on the received $n^{th}$ uplink transmission; and
transmit, to the second device, the $n^{th}$ power control command for the second device in a $n^{th}$ subset of the downlink resources, while receiving, from the device, a $(n+1)^{th}$ uplink transmission in a $(n+1)^{th}$ subset of the uplink resources based on the transmitted downlink grant and based on transmitted $(n-1)^{th}$ power control command;

generate a $(n+1)^{th}$ power control command for the device based on the received $(n+1)^{th}$ uplink transmission; and transmit, to the device, the $(n+1)^{th}$ power control command for the device in a $(n+1)^{th}$ subset of the downlink resources, while receiving, from the second device, a $(n+2)^{th}$ uplink transmission in a $(n+2)^{th}$ subset of the uplink resources based on the transmitted downlink grant and based on the transmitted $n^{th}$ power control command, wherein n is an even number greater than or equal to 2.

51. A device for wireless communication, comprising:
a memory; and
at least one processor coupled to the memory and configured to:
divide a transmission block of data into data segments;
transmit a request for uplink resources for communicating the data segments; and
receive a downlink grant for the device, the downlink grant indicating to the device subsets of uplink resources allocated for transmitting the data segments and subsets of downlink resources for receiving power control commands for respective data segments, the subsets of the uplink resources being non-concurrent with the subsets of the downlink resources.

52. The device of claim 51, wherein the at least one processor is further configured to:
transmit, to a base station, a first uplink transmission in a first subset of the uplink resources based on the received downlink grant; and
receive, from the base station, a first power control command in a first subset of the downlink resources, wherein the first power control command is based on the transmitted first uplink transmission.

53. The device of claim 52, wherein the at least one processor is further configured to:
transmit, to the base station, a second uplink transmission in a second subset of the uplink resources based on the received downlink grant and based on the received first power control command; and
receive, from the base station, a second power control command in a second subset of the downlink resources, wherein the second power control command is based on the transmitted second uplink transmission.

54. The device of claim 52, wherein the at least one processor is further configured to:
transmit, to the base station, a $n^{th}$ uplink transmission in a $n^{th}$ subset of the uplink resources based on the received downlink grant and based on received $(n-1)^{th}$ power control command; and
receive, from the base station, the $n^{th}$ power control command in a $n^{th}$ subset of the downlink resources, wherein the $n^{th}$ power control command is based on the transmitted $n^{th}$ uplink transmission,
wherein n is greater than or equal to 2.

55. The device of claim 51, wherein the downlink grant includes a power control command for a first uplink transmission in a first subset of the uplink resources.

56. The device of claim 51, wherein the at least one processor is further configured to:
receive the size for each of the data segments to the device, wherein the transmission block of data is divided into the data segments based on the size for each of the data segments.

57. The device of claim 56, wherein the size of each of the data segments is determined based on at least one of data traffic, path loss to the device, a size of a transmission block, or a noise level.

58. A non-transitory computer-readable medium storing computer executable code for a base station, comprising code to:
generate a downlink grant for a device, the downlink grant indicating to the device subsets of uplink resources allocated for transmitting data segments and subsets of downlink resources for receiving power control commands for respective data segments, the subsets of the uplink resources being non-concurrent with the subsets of the downlink resources; and
transmit the downlink grant to the device.

59. A non-transitory computer-readable medium storing computer executable code for a device, comprising code to:
divide a transmission block of data into data segments; and
transmit a request for uplink resources for communicating the data segments; and
receive a downlink grant for the device, the downlink grant indicating to the device subsets of uplink resources allocated for transmitting the data segments and subsets of downlink resources for receiving power control commands for respective data segments, the subsets of the uplink resources being non-concurrent with the subsets of the downlink resources.

* * * * *